United States Patent
Zhu et al.

(10) Patent No.: US 11,550,461 B2
(45) Date of Patent: Jan. 10, 2023

(54) SCREEN LOCKING METHOD AND APPARATUS

(71) Applicant: Huawei Technologies Co., Ltd., Shenzhen (CN)

(72) Inventors: Dengkui Zhu, Beijing (CN); Jian Song, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/622,685

(22) PCT Filed: Oct. 9, 2017

(86) PCT No.: PCT/CN2017/105411
§ 371 (c)(1),
(2) Date: Dec. 13, 2019

(87) PCT Pub. No.: WO2018/227825
PCT Pub. Date: Dec. 20, 2018

(65) Prior Publication Data
US 2020/0117350 A1 Apr. 16, 2020

(51) Int. Cl.
*G06F 3/04847* (2022.01)
*H04W 76/10* (2018.01)
(Continued)

(52) U.S. Cl.
CPC ........ *G06F 3/04847* (2013.01); *G06F 3/1415* (2013.01); *G06F 3/1423* (2013.01);
(Continued)

(58) Field of Classification Search
CPC .... G06F 3/1423; G06F 3/0481; G06F 21/604; G06F 21/6245; G06F 21/6209;
(Continued)

(56) References Cited

U.S. PATENT DOCUMENTS 5,107,443 A * 4/1992 Smith .................... G06Q 10/10
715/803
8,819,268 B1 * 8/2014 Sauer ...................... H04L 67/36
709/248
(Continued)

FOREIGN PATENT DOCUMENTS

CN 102523498 A 6/2012
CN 102999251 A 3/2013
(Continued)

OTHER PUBLICATIONS

Machine Translation and Abstract of Chinese Publication No. CN102523498, Jun. 27, 2012, 14 pages.
(Continued)

*Primary Examiner* — Nicholas Klicos
(74) *Attorney, Agent, or Firm* — Conley Rose, P.C.

(57) ABSTRACT

A screen locking method and apparatus include establishing, by a first electronic device, a coupling to a second electronic device, sending, by the first electronic device, to-be-displayed data to the second electronic device to enable the second electronic device to display a first interface, and in this case, the first electronic device displays a second interface different from the first interface, obtaining, by the first electronic device, a first screen locking operation from a user, where the first screen locking operation instructs to lock a screen of the second electronic device, and sending, by the first electronic device, a screen locking instruction to the second electronic device in response to the first screen locking operation whereby the second electronic device enters a screen-locked state.

24 Claims, 32 Drawing Sheets

(51) Int. Cl.
  *G06F 9/451* (2018.01)
  *G06F 21/60* (2013.01)
  *G06F 21/62* (2013.01)
  *G06F 3/14* (2006.01)

(52) U.S. Cl.
  CPC ............ *G06F 9/451* (2018.02); *G06F 21/604* (2013.01); *G06F 21/629* (2013.01); *G06F 21/6245* (2013.01); *H04W 76/10* (2018.02)

(58) Field of Classification Search
  CPC ....... G06F 21/74; H04W 76/10; H04W 12/02; H04M 1/72463
  See application file for complete search history.

(56) References Cited

U.S. PATENT DOCUMENTS

| | | | | |
|---|---|---|---|---|
| 8,856,948 | B1* | 10/2014 | Robison | G06F 21/32 726/26 |
| 9,454,251 | B1* | 9/2016 | Guihot | G06F 3/0412 |
| 2005/0091610 | A1* | 4/2005 | Frei | G06F 3/0481 715/825 |
| 2006/0031779 | A1* | 2/2006 | Theurer | G06F 3/1454 715/781 |
| 2006/0129948 | A1* | 6/2006 | Hamzy | G06F 21/84 715/790 |
| 2007/0277127 | A1* | 11/2007 | Carlson | G06F 9/451 715/867 |
| 2008/0148184 | A1* | 6/2008 | Davis | G06F 3/1423 715/810 |
| 2009/0061841 | A1* | 3/2009 | Chaudhri | H04L 65/1059 455/420 |
| 2010/0298033 | A1* | 11/2010 | Lee | G06F 1/1692 455/566 |
| 2011/0004888 | A1* | 1/2011 | Srinivasan | G06F 9/452 719/329 |
| 2011/0029915 | A1* | 2/2011 | Harris | G06F 3/1423 715/781 |
| 2012/0102549 | A1* | 4/2012 | Mazzaferri | H04L 63/107 726/4 |
| 2013/0148720 | A1* | 6/2013 | Rabii | G06F 9/542 375/240.12 |
| 2013/0309648 | A1 | 11/2013 | Park et al. | |
| 2014/0040756 | A1 | 2/2014 | Bukurak et al. | |
| 2014/0273967 | A1 | 9/2014 | Kwon et al. | |
| 2014/0359454 | A1* | 12/2014 | Lee | G06F 3/048 715/734 |
| 2014/0359493 | A1 | 12/2014 | Hong et al. | |
| 2014/0362293 | A1 | 12/2014 | Bakar et al. | |
| 2015/0249714 | A1 | 9/2015 | Vedula et al. | |
| 2016/0164852 | A1 | 6/2016 | McCoy et al. | |
| 2016/0313960 | A1 | 10/2016 | Zhou et al. | |
| 2016/0364574 | A1 | 12/2016 | Plette et al. | |
| 2018/0053003 | A1* | 2/2018 | Nair | H04L 63/0407 |
| 2018/0285051 | A1* | 10/2018 | Cawley | G06F 3/0488 |
| 2019/0034075 | A1* | 1/2019 | Smochko | G06F 3/04842 |
| 2019/0303088 | A1* | 10/2019 | Yuan | G06F 3/0482 |

FOREIGN PATENT DOCUMENTS

| | | |
|---|---|---|
| CN | 103345607 A | 10/2013 |
| CN | 103607510 A | 2/2014 |
| CN | 103728894 A | 4/2014 |
| CN | 104020937 A | 9/2014 |
| CN | 104052868 A | 9/2014 |
| CN | 104238986 A | 12/2014 |
| CN | 104902075 A | 9/2015 |
| CN | 104978156 A | 10/2015 |
| CN | 105100907 A | 11/2015 |
| CN | 105120094 A | 12/2015 |
| CN | 105376701 A | 3/2016 |
| CN | 105554750 A | 5/2016 |
| CN | 105574426 A | 5/2016 |
| CN | 105653301 A | 6/2016 |
| CN | 105681538 A | 6/2016 |
| CN | 105898044 A | 8/2016 |
| CN | 105912291 A | 8/2016 |
| CN | 106161763 A | 11/2016 |
| CN | 106657651 A | 5/2017 |
| WO | 2013170800 A1 | 11/2013 |
| WO | 2016201014 A1 | 12/2016 |

OTHER PUBLICATIONS

Machine Translation and Abstract of Chinese Publication No. CN102999251, Mar. 27, 2013, 27 pages.
Machine Translation and Abstract of Chinese Publication No. CN103607510, Feb. 26, 2014, 18 pages.
Machine Translation and Abstract of Chinese Publication No. CN103728894, Apr. 16, 2014, 23 pages.
Machine Translation and Abstract of Chinese Publication No. CN104020937, Sep. 3, 2014, 19 pages.
Machine Translation and Abstract of Chinese Publication No. CN104238986, Dec. 24, 2014, 20 pages.
Machine Translation and Abstract of Chinese Publication No. CN104902075, Sep. 9, 2015, 29 pages.
Machine Translation and Abstract of Chinese Publication No. CN105120094, Dec. 2, 2015, 34 pages.
Machine Translation and Abstract of Chinese Publication No. CN105376701, Mar. 2, 2016, 10 pages.
Machine Translation and Abstract of Chinese Publication No. CN105554750, May 4, 2016, 18 pages.
Machine Translation and Abstract of Chinese Publication No. CN105574426, May 11, 2016, 19 pages.
Machine Translation and Abstract of Chinese Publication No. CN105898044, Aug. 24, 2016, 15 pages.
Machine Translation and Abstract of Chinese Publication No. CN105912291, Aug. 31, 2016, 57 pages.
Machine Translation and Abstract of Chinese Publication No. CN106657651, May 10, 2017, 25 pages.
Machine Translation and Abstract of International Publication No. WO2013170800, Nov. 21, 2013, 14 pages.
CNET, "Miracast: Everything to know about mirroring Android," Sep. 24, 2013, 4 pages.
Foreign Communication From A Counterpart Application, Chinese Application No. 201780008041.7, Chinese Office Action dated Aug. 27, 2019, 15 pages.
Foreign Communication From A Counterpart Application, PCT Application No. PCT/CN2017/088818, International Search Report dated Dec. 13, 2017, 12 pages.
Foreign Communication From A Counterpart Application, PCT Application No. PCT/CN2017/105411, English Translation of International Search Report dated Mar. 21, 2018, 2 pages.
Foreign Communication From A Counterpart Application, PCT Application No. PCT/CN2017/105411, English Translation of Written Opinion dated Mar. 21, 2018, 5 pages.
Apple, "Apple Remote Desktop—Romote Assistance," XP055682829, Oct. 11, 2016, 2 pages.

* cited by examiner

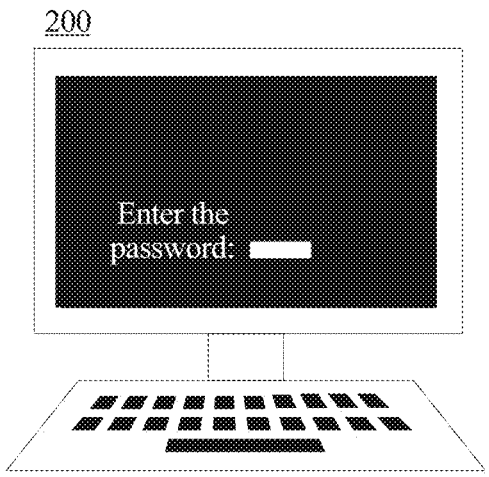 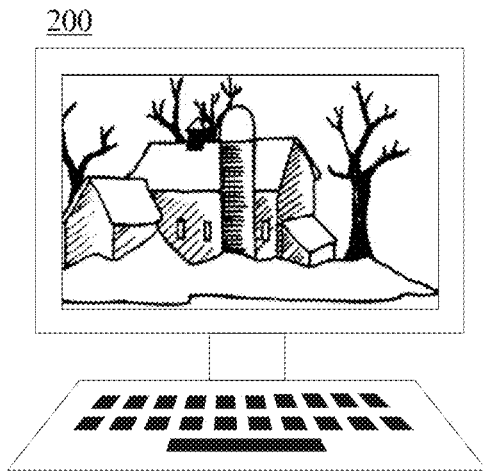
FIG. 7(a)  FIG. 7(b)
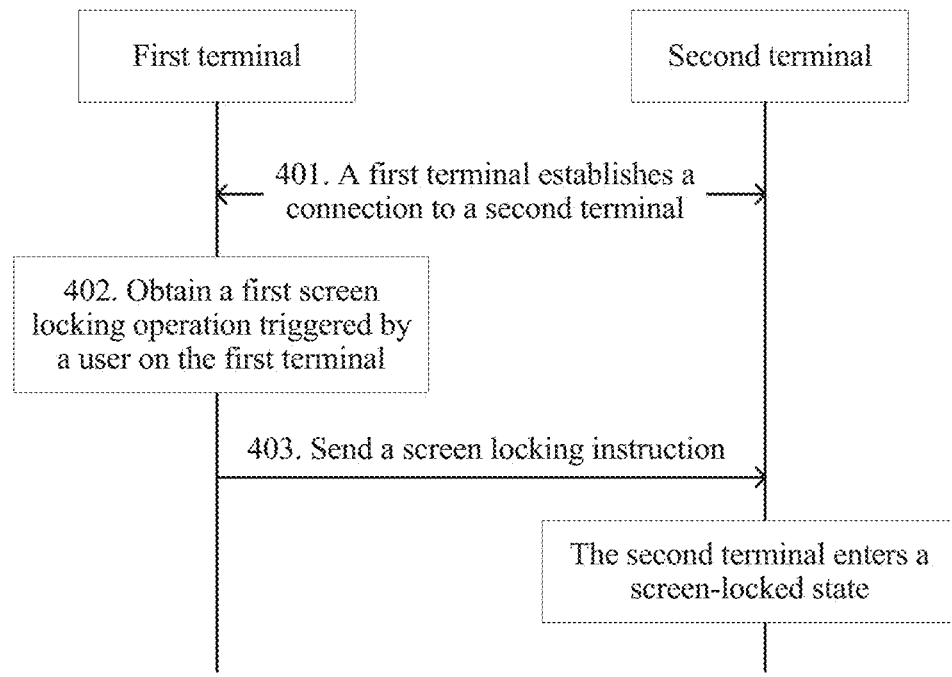
FIG. 8

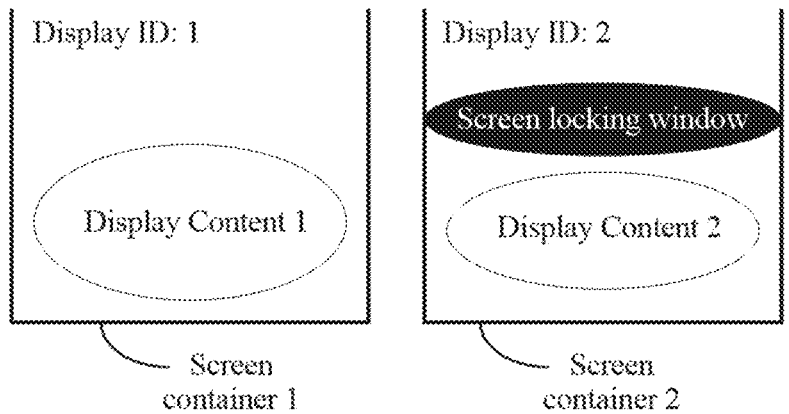
FIG. 11
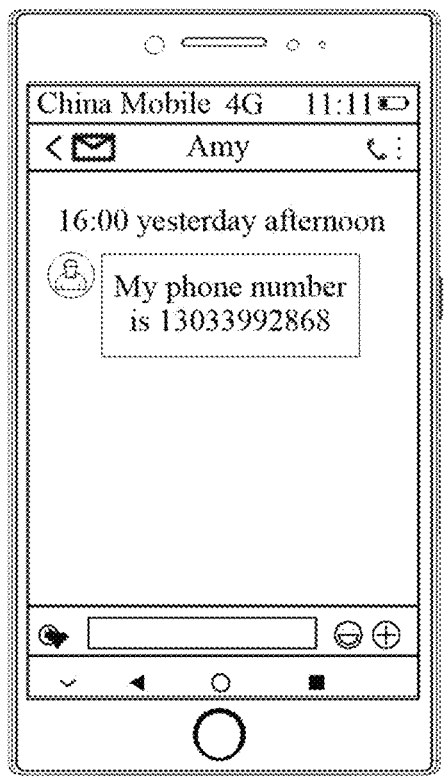 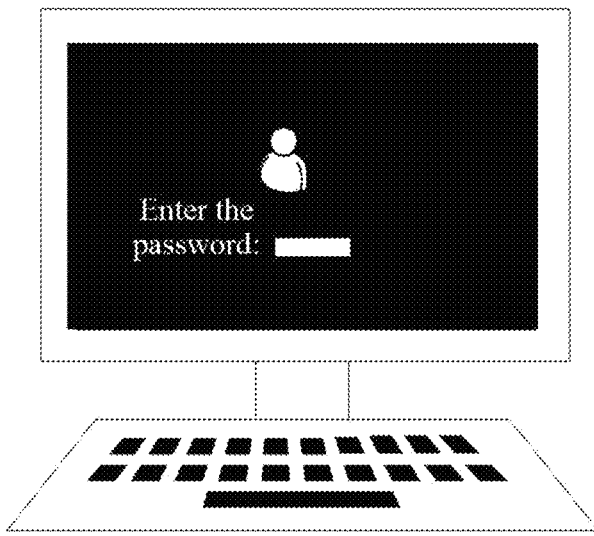
FIG. 12

SCREEN LOCKING METHOD AND APPARATUS

CROSS-REFERENCE TO RELATED APPLICATIONS

This application is a U.S. National Stage of International Patent Application No. PCT/CN2017/105411 filed on Oct. 9, 2017, which claims priority to International Patent Application No. PCT/CN2017/088818 filed on Jun. 16, 2017. Both of the aforementioned applications are hereby incorporated by reference in their entireties.

TECHNICAL HELD

Embodiments of this application relate to the field of communications technologies, and in particular, to a screen locking method and apparatus.

BACKGROUND

A mobile terminal such as a mobile phone may establish a Wi-Fi display (Wi-Fi Display) connection to a large-screen terminal such as a television or a PC display. In this way, the mobile phone may project stored or displayed content onto the large-screen terminal for display, so that a user can enjoy a high-definition image display effect on the large-screen terminal.

After the Wi-Fi display connection is established, it is equivalent to that the mobile phone has two displays, one is a display of the mobile phone, and the other is a display of the large-screen terminal connected to the mobile phone. Usually, a display status of the display of the mobile phone is synchronized with a display status of the display of the large-screen terminal. For example, when the mobile phone is in a screen-locked state, the large-screen terminal is also in a screen-locked state; or when the mobile phone is in a screen-unlocked state, the large-screen terminal is also in a screen-unlocked state.

Therefore, when the user needs to perform a relatively private operation, for example, read an SMS message or make a call, if the Wi-Fi display connection to the large-screen terminal is not disconnected, user privacy displayed on the mobile phone is also projected onto the display of the large-screen terminal, and consequently a security risk of user privacy disclosure is undoubtedly increased.

SUMMARY

Embodiments of this application provide a screen locking method and apparatus, so that when a terminal performs display on a multi-screen, a security risk of user privacy disclosure can be reduced.

To achieve the foregoing objective, the embodiments of this application use the following technical solutions:

According to a first aspect, an embodiment of this application provides a screen locking method, including: after a first terminal establishes a connection to a second terminal, sending, by the first terminal, to-be-displayed data to the second terminal, so that the second terminal displays a first interface, and in this case, the first terminal displays a second interface different from the first interface; then, obtaining, by the first terminal, a first screen locking operation triggered by a user, where the first screen locking operation is used to instruct to lock a screen of the second terminal; and sending, by the first terminal, a screen locking instruction to the second terminal in response to the first screen locking operation, so that the second terminal enters a screen-locked state. In this way, when the first terminal is in a screen-unlocked state, performing the first screen locking operation on the first terminal by the user may enable the second terminal to enter the screen-locked state, so as to prevent display content on the second terminal from being disclosed.

In a possible design method, the sent screen locking instruction includes screen-locked interface data, and the screen-locked interface data is used to instruct the second terminal to display a screen-locked interface corresponding to the screen-locked interface data.

In a possible design method, a screen-locked interface displayed after the second terminal enters the screen-locked state is the same as the first interface. Therefore, after the screen of the second terminal is subsequently unlocked, the second terminal may continue to display an interface displayed before screen locking, so as to implement a seamless display interface connection on the second terminal.

In a possible design method, a screen locking button is disposed on the second interface; and the obtaining, by the first terminal, a first screen locking operation triggered by a user includes: obtaining, by the first terminal, the first screen locking operation performed by the user on the screen locking button.

In a possible design method, after the second terminal enters the screen-locked state, the method further includes: displaying, by the first terminal, an icon of a screen unlocking button; where the icon of the screen unlocking button and an icon of the screen locking button are at a same location.

In a possible design method, before the first terminal establishes the connection to the second terminal, the method further includes: displaying, by the first terminal, an icon of a connection button for connecting to the second terminal, where the icon of the connection button and the icon of the screen locking button are at a same location.

In a possible design method, the method further includes: obtaining, by the first terminal, a second screen locking operation triggered by the user, where the second screen locking operation is used to instruct to lock a screen of the first terminal; sending, by the first terminal, the screen locking instruction to the second terminal in response to the second screen locking operation, so that the second terminal enters the screen-locked state; and displaying, by the first terminal, a screen-locked interface in response to the second screen locking operation, so that the first terminal enters a screen-locked state. In other words, when the screen of the first terminal is locked, the second terminal is triggered to enter the screen-locked state, so as to ensure that the second terminal that shares the screen with the first terminal does not disclose user-related information when the screen of the first terminal is locked.

In a possible design method, the screen locking method further includes: when the first terminal enters a screen-locked state, obtaining, by the first terminal, a current screen state of the second terminal; and if the second terminal is in a state in which the screen is not locked, still keeping, by the first terminal, in the screen-off state for power saving. However, in this case, the first terminal does not enter the screen-locked state, so as to avoid a problem that normal running of the second terminal is interfered with when a screen locking operation on the second terminal is also triggered after the screen of the first terminal is locked.

In a possible design method, the screen locking method further includes: receiving, by the first terminal, a timing screen locking time entered by the user, where the timing screen locking time is used to indicate a time at which the second terminal enters the screen-locked state; and when the timing screen locking time arrives, sending, by the first terminal, the screen locking instruction to the second terminal, so that the second terminal enters the screen-locked state, thereby implementing a timing screen locking function on the second terminal.

According to a second aspect, an embodiment of this application provides a screen locking method, including: presenting, by a first terminal, a first interface, where the first interface is an interface presented when a first application is run; after the first terminal establishes a connection to a second terminal, sending, by the first terminal, to-be-displayed data to the second terminal, so that the second terminal displays a second interface; and if the first terminal presents a third interface, sending, by the first terminal, a screen locking instruction to the second terminal, so that the second terminal enters a screen-locked state, where the third interface includes an interface element associated with a second application, and the second application is different from the first application. In this way, the first terminal may automatically initiate the screen locking instruction to the second terminal in an application scenario that relates to user privacy, and therefore the second terminal may enter the screen-locked state without requiring a user to manually trigger a screen locking process for the second terminal, thereby improving intelligent human-computer interaction.

In a possible design method, a screen-locked interface displayed after the second terminal enters the screen-locked state is the same as the second interface.

In a possible design method, the third interface displays a notification message of the second application. After the sending, by the first terminal, a screen locking instruction to the second terminal, the method further includes: when the first terminal stops displaying the notification message of the second application, sending, by the first terminal, a screen unlocking instruction to the second terminal, so that the second terminal enters a screen-unlocked state.

In a possible design method, the third interface is an interface presented when the second application is run. After the sending, by the first terminal, a screen locking instruction to the second terminal, the method further includes: when the second application is not run in the foreground of the first terminal, sending, by the first terminal, a screen unlocking instruction to the second terminal, so that the second terminal enters a screen-unlocked state.

In other words, the first terminal may automatically recover the screen-unlocked state of the second terminal in an application scenario that does not relate to user privacy, and therefore the second terminal may enter the screen-unlocked state without requiring the user to manually trigger a screen unlocking process for the second terminal, thereby improving intelligent human-computer interaction.

According to a third aspect, an embodiment of this application provides a screen unlocking method, including: establishing, by a first terminal, a connection to a second terminal; receiving, by the first terminal, an unlocking request sent by the second terminal, where the unlocking request is used to request the first terminal to terminate a screen-locked state of the second terminal; and sending; by the first terminal, a screen unlocking instruction to the second terminal in response to the unlocking request, so that the second terminal enters a screen-unlocked state.

In a possible design method, the sending, by the first terminal, a screen unlocking instruction to the second terminal in response to the unlocking request includes: in response to the unlocking request, prompting, by the first terminal, a user Whether to unlock a screen of the second terminal; and when it is detected that the user unlocks the screen of the second terminal, sending, by the first terminal, the screen unlocking instruction to the second terminal.

In a possible design method, the sending, by the first terminal, a screen unlocking instruction to the second terminal in response to the unlocking request includes: in response to the unlocking request, determining, by the first terminal, whether display content including user privacy is displayed; and when the display content including user privacy is not displayed, sending, by the first terminal, the screen unlocking instruction to the second terminal.

It can be learned that in this embodiment of this application, independent screen locking windows are respectively disposed on a screen of the first terminal and the screen of the second terminal. Therefore, when the screen of the second terminal needs to be locked, the first terminal may control the second terminal to load the screen locking window of the second terminal, or the second terminal itself may load the screen locking window of the second terminal, so as to reduce a risk of user privacy disclosure caused by projecting user privacy displayed on the first terminal onto the second terminal. When the screen of the second terminal needs to be unlocked, the first terminal grants screen unlocking permission to the second terminal to control the second terminal to remove the loaded screen locking window, so as to avoid a risk of user privacy disclosure occurring after the screen of the second terminal is unlocked.

In a possible design method, after the establishing, by a first terminal, a connection to a second terminal, the method further includes: sending, by the first terminal, a screen locking instruction to the second terminal, so that the second terminal enters a screen-locked state.

According to a fourth aspect, an embodiment of this application provides a terminal, including a display, a processor, a transceiver, a communications interface, and an input device that are connected by using a bus, where the communications interface is configured to establish a connection between the terminal and another terminal; the transceiver is configured to send to-be-displayed data to the another terminal, so that the another terminal displays a first interface, where the display of the terminal displays a second interface, and the first interface is different from the second interface; the input device is configured to obtain a first screen locking operation triggered by a user, where the first screen locking operation is used to instruct to lock a screen of the another terminal; and the transceiver is further configured to send a screen locking instruction to the another terminal in response to the first screen locking operation, so that the another terminal enters a screen-locked state.

In a possible design method, the sent screen locking instruction includes screen-locked interface data, and the screen-locked interface data is used to instruct the another terminal to display a screen-locked interface corresponding to the screen-locked interface data.

In a possible design method, a screen-locked interface displayed after the another terminal enters the screen-locked state is the same as the first interface.

In a possible design method, a screen locking button is disposed on the second interface; and the input device is specifically configured to obtain the first screen locking operation performed by the user on the screen locking button.

In a possible design method, the display is further configured to display an icon of a screen unlocking button, where the icon of the screen unlocking button and an icon of the screen locking button are at a same location.

In a possible design method, the display is further configured to display an icon of a connection button for connecting to the another terminal, where the icon of the connection button and the icon of the screen locking button are at a same location.

In a possible design method, the input device is further configured to obtain a second screen locking operation triggered by the user, where the second screen locking operation is used to instruct to lock a screen of the terminal; the transceiver is further configured to send the screen locking instruction to the another terminal in response to the second screen locking operation, so that the another terminal enters the screen-locked state; and the display is further configured to display a screen-locked interface in response to the second screen locking operation, so that the terminal enters a screen-locked state.

In a possible design method, the transceiver is further configured to: when the first terminal enters a screen-locked state, obtain a current screen state of the second terminal; and the display is further configured to: if the second terminal is in a state in which the screen is not locked; keep in the screen-off state.

In a possible design method, the input device is further configured to receive a timing screen locking time entered by the user, where the timing screen locking time is used to indicate a time at which the second terminal enters the screen-locked state; and the transceiver is further configured to: when the timing screen locking time arrives; send the screen locking instruction to the second terminal, so that the second terminal enters the screen-locked state.

According to a fifth aspect, an embodiment of this application provides a terminal, including a display, a processor, a transceiver, and a communications interface that are connected by using a bus, where the communications interface is configured to establish a connection between the terminal and another terminal; the display is configured to present a first interface, where the first interface is an interface presented when the first application is run; and the transceiver is configured to: send to-be-displayed data to the another terminal, so that the another terminal displays a second interface; and if the display presents a third interface, send a screen locking instruction to the another terminal, so that the another terminal enters a screen-locked state, where the third interface includes an interface element associated with a second application, and the second application is different from the first application.

In a possible design method, a screen-locked interface displayed after the another terminal enters the screen-locked state is the same as the second interface.

In a possible design method, the third interface displays a notification message of the second application; and the transceiver is further configured to: when the display stops displaying the notification message of the second application, send a screen unlocking instruction to the another terminal, so that the another terminal enters a screen-unlocked state.

In a possible design method, the third interface is an interface presented when the second application is run; and the transceiver is further configured to: when the second application is not run in the foreground of the terminal; send a screen unlocking instruction to the another terminal, so that the another terminal enters a screen-unlocked state.

According to a sixth aspect, an embodiment of this application provides a terminal; including a transceiver and a communications interface; where the communications interface is configured to establish a connection between the terminal and another terminal; and the transceiver is configured to: receive an unlocking request sent by the another terminal; where the unlocking request is used to request the terminal to terminate a screen-locked state of the another terminal; and send a screen unlocking instruction to the another terminal in response to the unlocking request, so that the another terminal enters a screen-unlocked state.

In a possible design method, the terminal further includes a display; the display is configured to prompt a user whether to unlock a screen of the another terminal; and the transceiver is specifically configured to: when it is detected that the user unlocks the screen of the another terminal, send the screen unlocking instruction to the another terminal.

In a possible design method, the processor is configured to determine whether display content including user privacy is displayed; and the transceiver is specifically configured to: when the display content including user privacy is not displayed, send the screen unlocking instruction to the another terminal.

In a possible design method, the transceiver is further configured to send a screen locking instruction to the another terminal, so that the another terminal enters a screen-locked state.

According to a seventh aspect, an embodiment of this application provides a terminal, including: a communications unit, configured to: establish a connection to another terminal; and send to-be-displayed data to the another terminal, so that the another terminal displays a first interface, where the terminal displays a second interface, and the first interface is different from the second interface; an obtaining unit, configured to obtain a first screen locking operation triggered by a user, where the first screen locking operation is used to instruct to lock a screen of the another terminal; and a locking unit, configured to send a screen locking instruction to the another terminal in response to the first screen locking operation, so that the another terminal enters a screen-locked state.

In a possible design method, the sent screen locking instruction includes screen-locked interface data, and the screen-locked interface data is used to instruct the another terminal to display a screen-locked interface corresponding to the screen-locked interface data.

In a possible design method, a screen-locked interface displayed after the another terminal enters the screen-locked state is the same as the first interface.

In a possible design method, a screen locking button is disposed on the second interface; and the obtaining unit is specifically configured to obtain the first screen locking operation performed by the user on the screen locking button.

In a possible design method, the terminal further includes a display unit, configured to display an icon of a screen unlocking button, where the icon of the screen unlocking button and an icon of the screen locking button are at a same location.

In a possible design method, the display unit is further configured to display an icon of a connection button for connecting to the another terminal, where the icon of the connection button and the icon of the screen locking button are at a same location.

In a possible design method, the obtaining unit is configured to obtain a second screen locking operation triggered by the user, where the second screen locking operation is used to instruct to lock a screen of the terminal; and the locking unit is further configured to: send the screen locking instruction to the another terminal in response to the second screen locking operation, so that the another terminal enters the screen-locked state; and display a screen-locked interface in response to the second screen locking operation, so that the terminal enters a screen-locked state.

According to an eighth aspect, an embodiment of this application provides a terminal, including a display unit, configured to present a first interface; where the first interface is an interface presented when a first application is run; a communications unit, configured to: establish a connection to another terminal; and send to-be-displayed data to the another terminal, so that the another terminal displays a second interface; and a locking unit, configured to: if the terminal presents a third interface, send a screen locking instruction to the another terminal, so that the another terminal enters a screen-locked state, where the third interface includes an interface element associated with a second application, and the second application is different from the first application.

In a possible design method, a screen-locked interface displayed after the another terminal enters the screen-locked state is the same as the second interface.

In a possible design method, the third interface displays a notification message of the second application. The terminal further includes an unlocking unit, configured to: when the terminal stops displaying the notification message of the second application, send a screen unlocking instruction to the another terminal, so that the another terminal enters a screen-unlocked state.

In a possible design method, the third interface is an interface presented when the second application is run. The terminal further includes an unlocking unit, configured to: when the second application is not run in the foreground of the terminal, send a screen unlocking instruction to the another terminal; so that the another terminal enters a screen-unlocked state.

According to a ninth aspect, an embodiment of this application provides a terminal, including a communications unit, configured to: establish a connection to another terminal; and receive an unlocking request sent by the another terminal; where the unlocking request is used to request the terminal to terminate a screen-locked state of the another terminal; and an unlocking unit, configured to send a screen unlocking instruction to the another terminal in response to the unlock request, so that the another terminal enters a screen-unlocked state.

In a possible design method, the unlocking unit is specifically configured to: in response to the unlocking request, prompt a user whether to unlock a screen of the another terminal; and when it is detected that the user unlocks the screen of the another terminal, send the screen unlocking instruction to the another terminal.

In a possible design method, the unlocking unit is specifically configured to: in response to the unlocking request, determine whether display content including user privacy is displayed; and when the display content including user privacy is not displayed, send the screen unlocking instruction to the another terminal.

In a possible design method, the terminal further includes a locking unit, configured to send a screen locking instruction to the another terminal, so that the another terminal enters a screen-locked state.

According to a tenth aspect, an embodiment of this application provides a terminal, including a processor, a memory, a bus, and a communications interface. The memory is configured to store a computer execution instruction, and the processor is connected to the memory by using the bus. When the terminal runs, the processor executes the computer execution instruction stored in the memory, so that the terminal performs any screen locking method or screen unlocking method described above.

According to an eleventh aspect, an embodiment of this application provides a computer readable storage medium. The computer readable storage medium stores an instruction, and when the instruction is run on any terminal described above, the terminal performs any screen locking method or screen unlocking method described above.

According to a twelfth aspect, an embodiment of this application provides a computer program product including an instruction, and when the computer program product is run on any terminal described above, the terminal performs any screen locking method or screen unlocking method described above.

In the embodiments of this application, a name of the terminal imposes no limitation on the device. In actual implementation, these devices may have other names, provided that functions of the devices are similar to those in the embodiments of this application, that is, fall within the scope of the claims of this application and their equivalent technologies.

BRIEF DESCRIPTION OF DRAWINGS

FIG. 7(a) and FIG. 7(b) are a schematic diagram 2 of an application scenario of a screen locking method according to an embodiment of this application;

FIG. 8 is a schematic interaction diagram 2 of a screen locking method according to an embodiment of this application;

FIG. 11 is a schematic diagram 5 of an application scenario of a screen locking method according to an embodiment of this application;

FIG. 12 is a schematic diagram 6 of an application scenario of a screen locking method according to an embodiment of this application;

DESCRIPTION OF EMBODIMENTS

The terms "first" and "second" mentioned below are merely intended for a purpose of description, and shall not be understood as an instruction or implication of relative importance or implicit instruction of the number of indicated technical features. Therefore, a feature limited by "first" or "second" may explicitly or implicitly include one or more features. In the descriptions of the embodiments of this application, "a plurality of" means two or more than two unless otherwise specified.

Figure 1A:
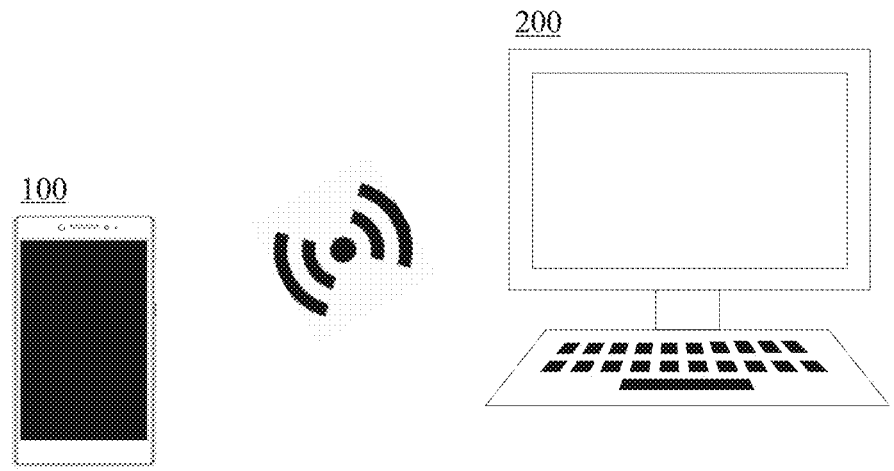
FIG. 1(a) and FIG. 1(b) are a schematic diagram of an application scenario of a screen locking method according to an embodiment of this application.
Figure 1B:
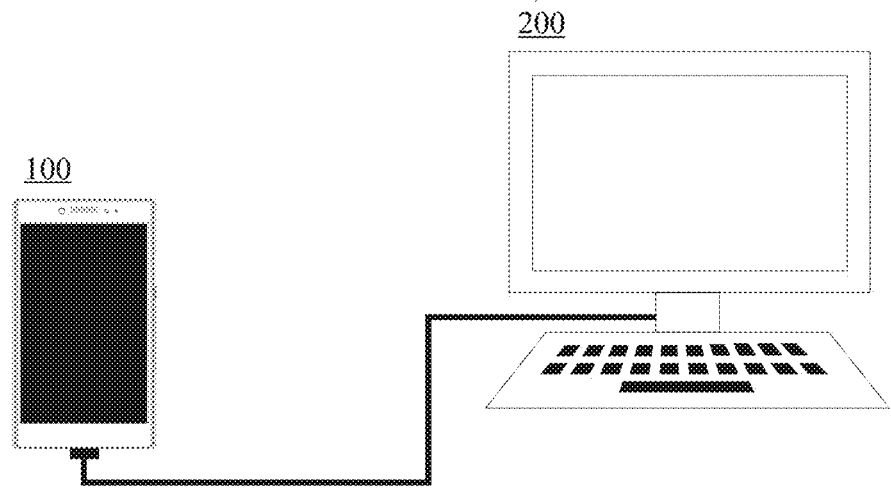

An embodiment of this application provides a screen locking method that may be applied to an application scenario in which a terminal performs display on a multi-screen, for example, a mobile office. For example, as shown in FIG. 1(a) and FIG. 1(b), a first terminal 100 may be a mobile phone, and a second terminal 200 may be a desktop computer or an independent display. As shown in (a) in FIG. 1, the first terminal 100 may establish a connection to the second terminal 200 through wireless communication (for example, through Wi-Fi). Alternatively, as shown in (b) in FIG. 1, the first terminal 100 may establish a communication connection to the second terminal 200 through wired communication (for example, by using a data line). This is not limited in this embodiment of this application.

The first terminal 100 may be used as a controlling device to project display content of a display of the first terminal 100 onto a display of the second terminal 200, so as to implement screen sharing between the first terminal 100 and the second terminal 200. Alternatively, the first terminal 100 may project other display content (namely, display content different from display content on a display of the first terminal 100) onto a display of the second terminal 200, so that the first terminal 100 can separately display different display content on the display of the first terminal 100 and the display of the second terminal 200.

In this embodiment of this application, to reduce a security risk of user privacy disclosure occurring when the second terminal 200 displays the display content of the first terminal 100, independent screen locking windows may be disposed on the first terminal 100 and the second terminal 200. In this way, when a user privacy-related application is run or displayed on the second terminal 200, the independent screen locking window may be loaded on the second terminal 200, so as to prevent user privacy on the first terminal 100 from being projected onto the display of the second terminal 200, thereby reducing the security risk of user privacy disclosure.

The first terminal 100 and the second terminal 200 each may be specifically any terminal such as a mobile phone, a wearable device, an AR (augmented reality) device/VR (virtual reality) device, a tablet computer, a notebook computer, a UMPC (ultra-mobile personal computer), a netbook, or a PDA (personal digital assistant). This is not limited in this embodiment of this application.

Figure 2:
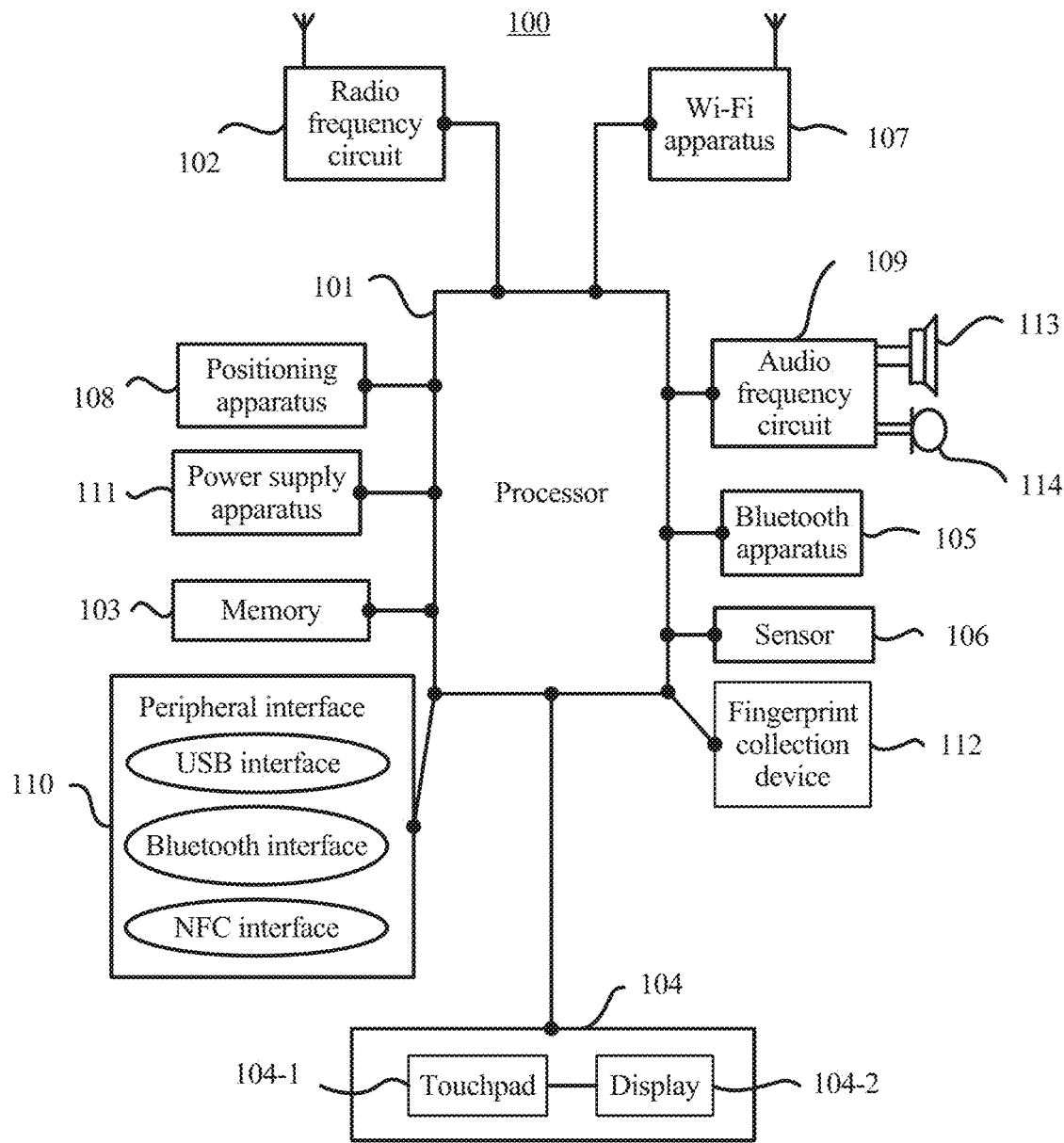
FIG. 2 is a schematic structural diagram 1 of a terminal according to an embodiment of this application.

As shown in FIG. 2, the first terminal (or the second terminal) in this embodiment of this application may be a mobile phone 300. The embodiment is described in detail below by using the mobile phone 300 as an example. It should be understood that the mobile phone 300 shown in the figure is merely an example of a terminal, and the mobile phone 300 may have more or fewer components than those shown in the figure, or combine two or more components, or have different component configurations.

As shown in FIG. 2, the mobile phone 300 may specifically include components such as a processor 101, a radio frequency (RF) circuit 102, a memory 103, a touchscreen 104, a Bluetooth apparatus 105, one or more sensors 106, a Wi-Fi apparatus 107, a positioning apparatus 108, an audio frequency circuit 109, a peripheral interface 110, and a power system 111. These components may communicate with each other by using one or more communications buses or signal cables (which are not shown in FIG. 2). A person skilled in the art may understand that a hardware structure shown in FIG. 2 does not constitute a limitation on the mobile phone, and the mobile phone 300 may include more or fewer components than those shown in the figure, or combine some components, or have different component arrangements.

The following specifically describes the components of the mobile phone 300 with reference to FIG. 2.

The processor 101 is a control center of the mobile phone 300, connects all parts of the mobile phone 300 by using various interfaces and lines, and performs various functions of the mobile phone 300 and data processing by running or executing an application (which may be referred to as APP for short hereinafter) stored in the memory 103 and by invoking data stored in the memory 103. In some embodiments, the processor 101 may include one or more processing units. For example, the processor 101 may be a chip Kirin 960 manufactured by Huawei Technologies Co., Ltd.

The radio frequency circuit 102 may be configured to receive and send a wireless signal in an information receiving and sending process or in a call process. Particularly, after receiving downlink data from a base station, the radio frequency circuit 102 may send the downlink data to the processor 101 for processing. In addition, the radio frequency circuit 102 sends related uplink data to the base station. The radio frequency circuit usually includes but is not limited to an antenna, at least one amplifier, a transceiver, a coupler, a low noise amplifier, and a duplexer. In addition, the radio frequency circuit 102 may further communicate with another device through wireless communication. The wireless communication may use any communications standard or protocol, including but not limited to a Global System for Mobile Communications, a general packet radio service, Code Division Multiple Access, Wideband Code Division Multiple Access, Long Term Evolution, an email, and an SMS message service.

The memory 103 is configured to store an application and data. The processor 101 performs various functions of the mobile phone 300 and data processing by running the application and the data stored in the memory 103. The memory 103 mainly includes a program storage area and a data storage area. The program storage area may store an operating system, and an application required by at least one function (for example, a sound playing function or an image playing function). The data storage area may store data (for example, audio data or a phone book) created when the mobile phone 300 is used. In addition, the memory 103 may include a high-speed random access memory, or may include a nonvolatile memory such as a magnetic disk storage device, a flash memory, or another volatile solid-state storage device. The memory 103 may store various operating systems such as an iOS operating system developed by Apple Inc. and an Android operating system developed by Google Inc.

The touchscreen 104 may include a touchpad 104-1 and a display 104-2. The touchpad 104-1 may collect a touch event (for example, an operation performed by a user on or near the touchpad 104-1 by using any proper object such as a finger or a stylus) performed by the user of the mobile phone 300 on or near the touchpad 104-1, and send collected touch information to another component such as the processor 101. Although the touchpad 104-1 and the display 104-2 in FIG. 2 are used as two independent components to implement input and output functions of the mobile phone 300, in some embodiments, the touchpad 104-1 and the display 104-2 may be integrated to implement the input and output functions of the mobile phone 300. It can be understood that the touchscreen 104 is obtained by stacking a plurality of layers of materials. In this embodiment of this application, only the touchpad (layer) and the display (layer) are displayed, and another layer is not recorded in this embodiment of this application. In addition, in some other embodiments of this application, the touchpad 104-1 may cover the display 104-2, and a size of the touchpad 104-1 is greater than a size of the display 104-2, so that the display 104-2 is completely covered by the touchpad 104-1. Alternatively, the touchpad 104-1 may be disposed on a front facet of the mobile phone 300 in a full panel manner, in other words, all touches performed by the user on the front facet of the mobile phone 300 can be perceived by the mobile phone, so that all-touch experience can be implemented on the front facet of the mobile phone. In some other embodiments, the touchpad 104-1 is disposed on a front facet of the mobile phone 300 in a full panel manner, and the display 104-2 may also be disposed on the front facet of the mobile phone 300 in a full panel manner, so that a frameless structure of the front facet of the mobile phone can be implemented.

In this embodiment of this application, the mobile phone 300 may further have a fingerprint recognition function. For example, a fingerprint sensor 112 may be disposed on a back facet of the mobile phone 300 (for example, below a rear-facing camera), or may be disposed on a front facet of the mobile phone 300 (for example, below the touchscreen 104). For another example, a fingerprint collection device 112 may be disposed on the touchscreen 104 to implement the fingerprint recognition function. In other words, the fingerprint collection device 112 and the touchscreen 104 may be integrated to implement the fingerprint recognition function of the mobile phone 300. In this case, the fingerprint collection device 112 may be disposed on the touchscreen 104 to serve as a part of the touchscreen 104, or may be disposed on the touchscreen 104 in another manner. In this embodiment of this application, a main component of the fingerprint collection device 112 is the fingerprint sensor, and the fingerprint sensor may use any sensing technology that includes but is not limited to an optical sensing technology, a capacitive sensing technology, a piezoelectric sensing technology, and an ultrasonic sensing technology.

In this embodiment of this application, the mobile phone 300 may further include the Bluetooth apparatus 105, configured to implement data exchange between the mobile phone 300 and another short-distance terminal (for example, a mobile phone or a smartwatch). The Bluetooth apparatus in this embodiment of this application may be an integrated circuit, a Bluetooth chip, or the like.

The Wi-Fi apparatus 107 is configured to provide the mobile phone 300 with network access that complies with a Wi-Fi-related standard protocol, and the mobile phone 300 may access a Wi-Fi access point by using the Wi-Fi apparatus 107, so as to help the user to receive and send an email, browse a web page, access streaming media, and the like, thereby providing the user with wireless broadband Internet access. In some other embodiments, the Wi-Fi apparatus 107 may be used as a Wi-Fi wireless access point, and may provide another terminal with Wi-Fi network access.

The mobile phone 300 may further include the at least one sensor 106 such as an optical sensor, a motion sensor, and another sensor. Specifically, the optical sensor may include an ambient light sensor and a proximity sensor. The ambient light sensor may adjust luminance of the display of the touchscreen 104 based on ambient light luminance. The proximity sensor may power off the display when the mobile phone 300 approaches to ears. As one of motion sensors, an accelerometer sensor may detect a value of an acceleration in each direction (usually, in three axes), may detect a value and a direction of gravity when the sensor is stationary, and may be used in a posture identification application of the mobile phone (for example, screen switching between a landscape mode and a portrait mode, a related game, and magnetometer posture calibration), a function related to vibration identification (such as a pedometer or a knock), and the like. Other sensors such as a gyroscope, a barometer, a hygrometer, a thermometer, and an infrared sensor may be further disposed on the mobile phone 300. Details are not described herein again.

The positioning apparatus 108 is configured to provide the mobile phone 300 with a geographical location. It can be understood that the positioning apparatus 108 may be specifically a receiver of a positioning system such as a global positioning system (GPS), a BeiDou Navigation Satellite System, or a GLONASS. After receiving the geographical location sent by the positioning system, the positioning apparatus 108 sends the information to the processor 101 for processing, or sends the information to the memory 103 for storage. In some other embodiments, the positioning apparatus 108 may be a receiver of an assisted global positioning system (AGPS), and the AGPS system is used as an auxiliary server to assist the positioning apparatus 108 in completing ranging and positioning services. In this case, the auxiliary positioning server communicates with a terminal such as the positioning apparatus 108 of the mobile phone 300 (namely, the GPS receiver) by using a wireless communications network, to provide positioning assistance. In some other embodiments, the positioning apparatus 108 may be a positioning technology based on the Wi-Fi access point. Each Wi-Fi access point has a globally unique MAC address, and the terminal can scan and collect a broadcast signal of a surrounding Wi-Fi access point when Wi-Fi is enabled. Therefore, the terminal can obtain the MAC address that is broadcast by the Wi-Fi access point. The terminal sends data (for example, the MAC address) that can identify the Wi-Fi access point to a location server through the wireless communications network. The location server retrieves a geographical location of each Wi-Fi access point, calculates a geographical location of the terminal with reference to strength of the Wi-Fi broadcast signal, and sends the geographical location to the positioning apparatus 108 of the terminal.

The audio frequency circuit 109, a loudspeaker 113, and a microphone 114 may provide an audio interface between the user and the mobile phone 300. The audio frequency circuit 109 may convert received audio data into an electrical signal and transmit the electrical signal to the loudspeaker 113, and the loudspeaker 113 converts the electrical signal into a sound signal and outputs the sound signal. In addition, the microphone 114 converts a collected sound signal into an electrical signal, and the audio frequency circuit 109 receives the electrical signal, converts the electrical signal into audio data, and outputs the audio data to the RF circuit 102 to send the audio data to, for example, another mobile phone, or outputs the audio data to the memory 103 for further processing.

The communications interface 110 is configured to provide various interfaces for an external input/output device (such as a keyboard, a mouse, an external display, an external memory, or a subscriber identity module card). For example, the communications interface is connected to the mouse or the display by using a universal serial bus (USB) interface; by using a metal contact on a subscriber identity module card slot, is connected to the subscriber identity module (SIM) card provided by a telecommunications operator; and communicates with another terminal by using an interface of the Wi-Fi apparatus 107, an interface of a near field communication (NFC) apparatus, an interface of a Bluetooth module, or the like. The communications interface 110 may be configured to couple the external input/output peripheral device to the processor 101 and the memory 103.

In this embodiment of this application, the first terminal 100 may establish a connection to a display of the second terminal 200 by using the communications interface 110 of the first terminal 100, so that the first terminal 100 and the second terminal 200 can communicate with each other.

The mobile phone 300 may further include the power supply apparatus 111 (such as a battery and a power management chip) that supplies power to each component, and the battery may be logically connected to the processor 101 by using the power management chip, so as to implement functions such as charging and discharging management and power consumption management by using the power supply apparatus 111.

Although not shown in FIG. 2, the mobile phone 300 may further include a camera (a front-facing camera and/or a rear-facing camera), a camera flash, a Micro projection apparatus, the near field communication (NFC) apparatus, and the like. Details are not described herein again.

Figure 3:
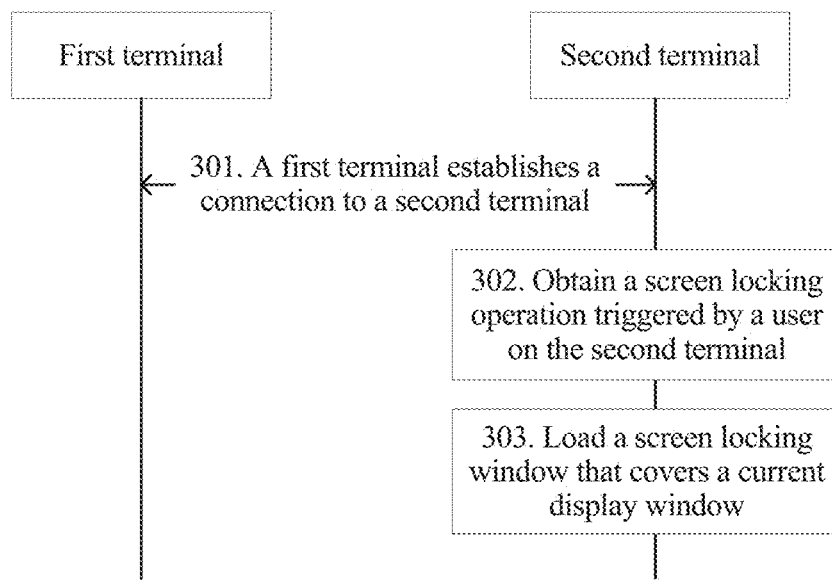
FIG. 3 is a schematic interaction diagram 1 of a screen locking method according to an embodiment of this application.

The following describes in detail a screen locking method according to an embodiment of this application with reference to a specific embodiment. As shown in FIG. 3, the method includes the following steps.

301. A first terminal establishes a connection to a second terminal.

The first terminal may establish the connection to the second terminal through communication such as Bluetooth, Wi-Fi, or ZigBee, so that the first terminal and the second terminal can communicate with each other. A specific connection establishment manner is not limited in this embodiment of this application.

In this embodiment of this application, after the first terminal 100 establishes the connection to the second terminal 200, the first terminal 100 may project display content of the first terminal 100 onto a display of the second terminal 200 by using a single-source display method or a multi-source display method.

Single-source display indicates that signal sources of display interfaces of different displays such as a display of the first terminal 100 and the display of the second terminal 200 are the same, and multi-source display indicates that a signal source of a display interface of the display of the first terminal 100 and a signal source of a display interface of the display of the second terminal 200 are independent.

Figure 4A:
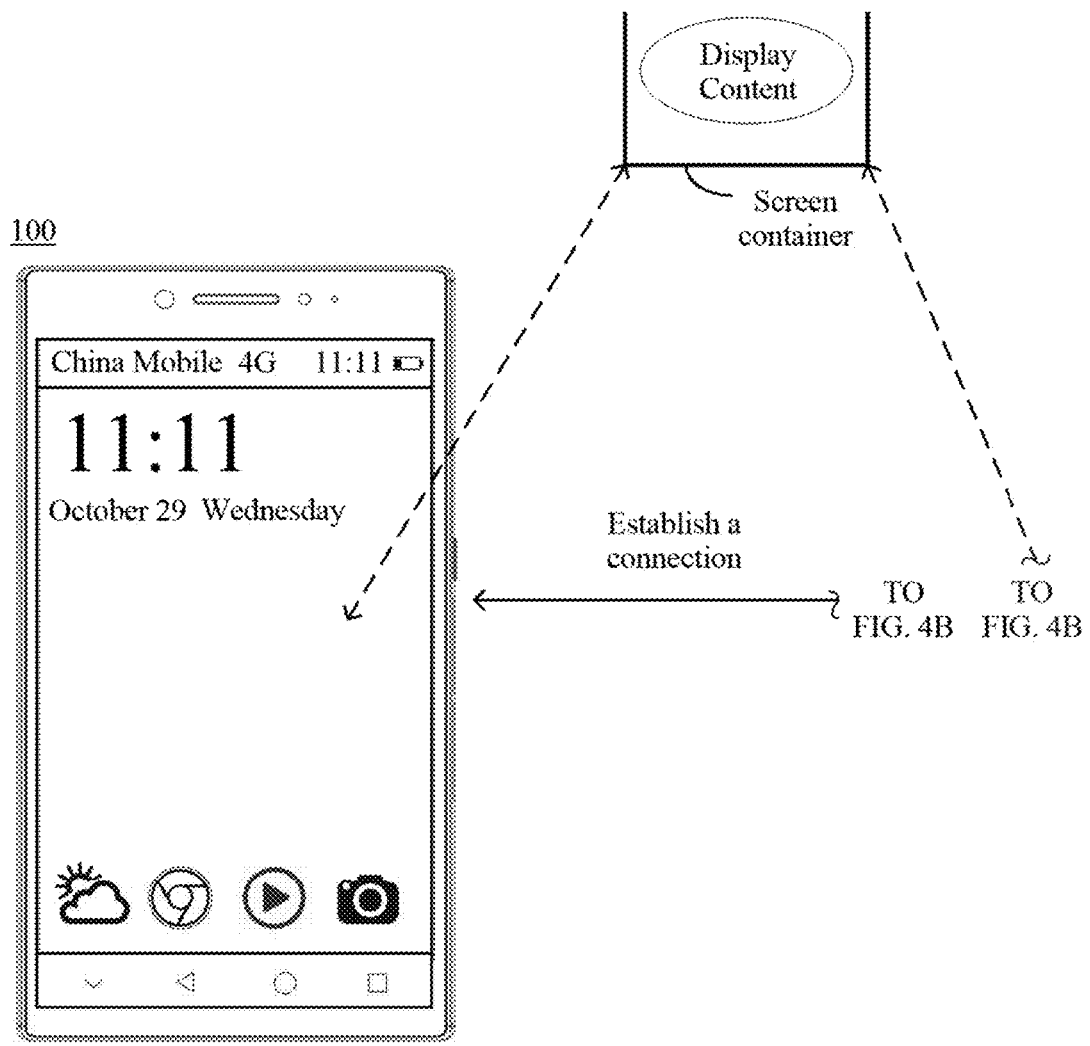
FIG. 4A and FIG. 4B are a schematic diagram of an application scenario of a single-source display method according to an embodiment of this application.
Figure 4B:
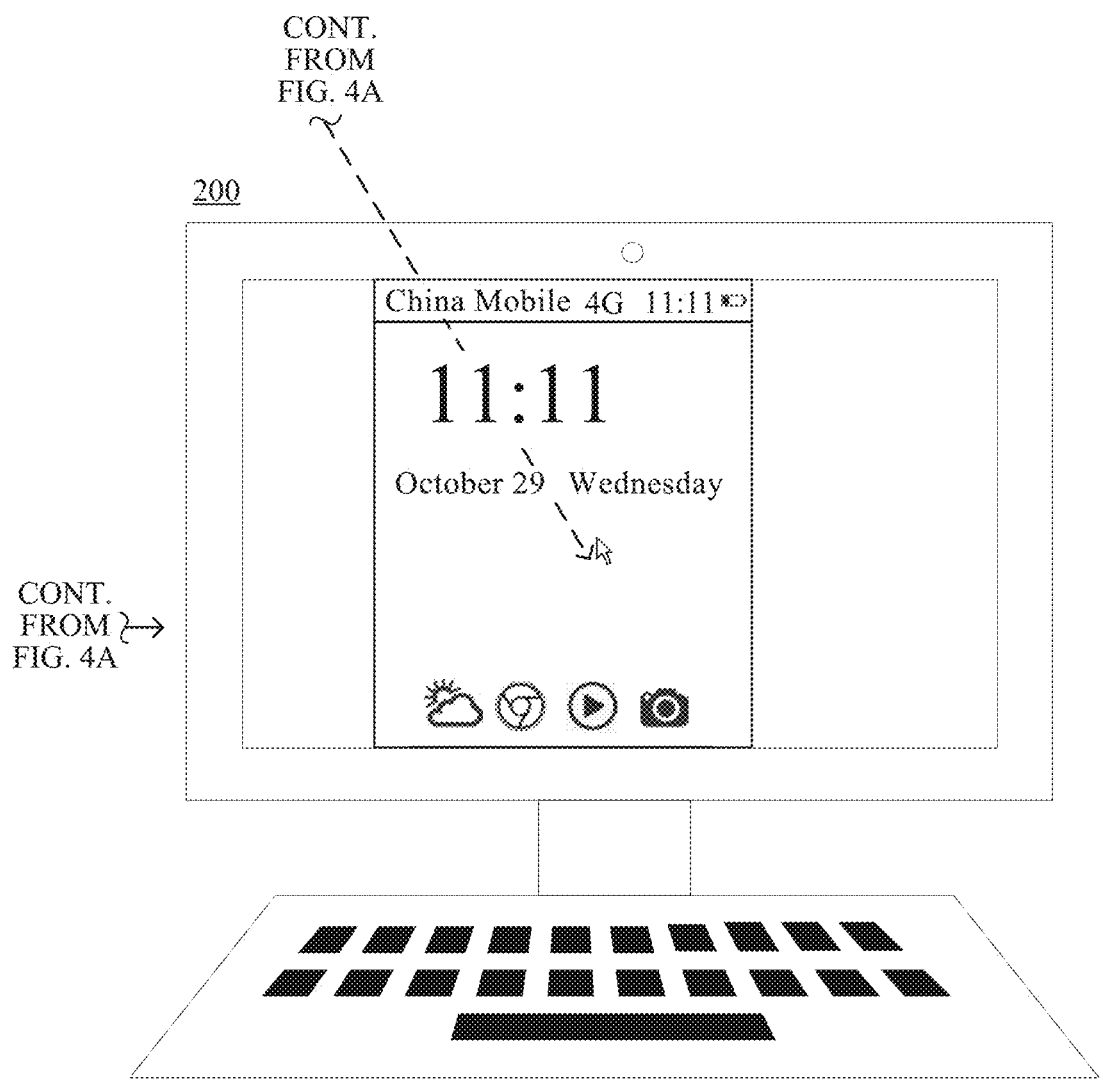

As shown in FIG. 4A and FIG. 4B, when the first terminal projects an application installed on the first terminal onto the display of the second terminal through single-source display, the first terminal 100 stores generated to-be-displayed display content in a screen container of a memory before the first terminal 100 establishes the connection to the second terminal 200. In this way, the display of the first terminal 100 may display a related image by reading the display content in the screen container. Still as shown in FIG. 4A and FIG. 4B, after the first terminal 100 establishes the connection to the second terminal 200, the display of the second terminal 200 may also display, by reading the display content in the screen container, display content that is the same as that of the first terminal 100, so as to implement synchronous display between the first terminal 100 and the second terminal 200.

Figure 5A:
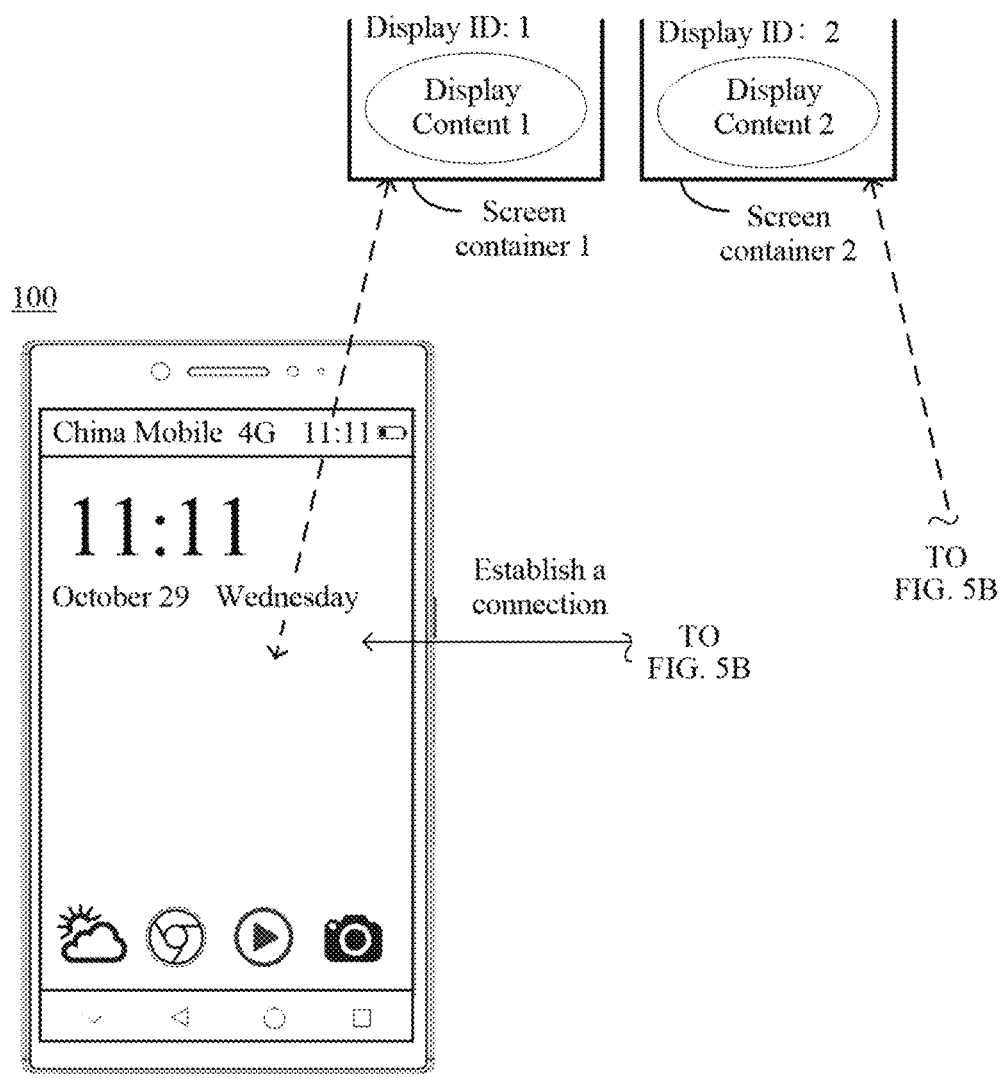
FIG. 5A and FIG. 5B are a schematic diagram of an application scenario of a multi-source display method according to an embodiment of this application.
Figure 5B:
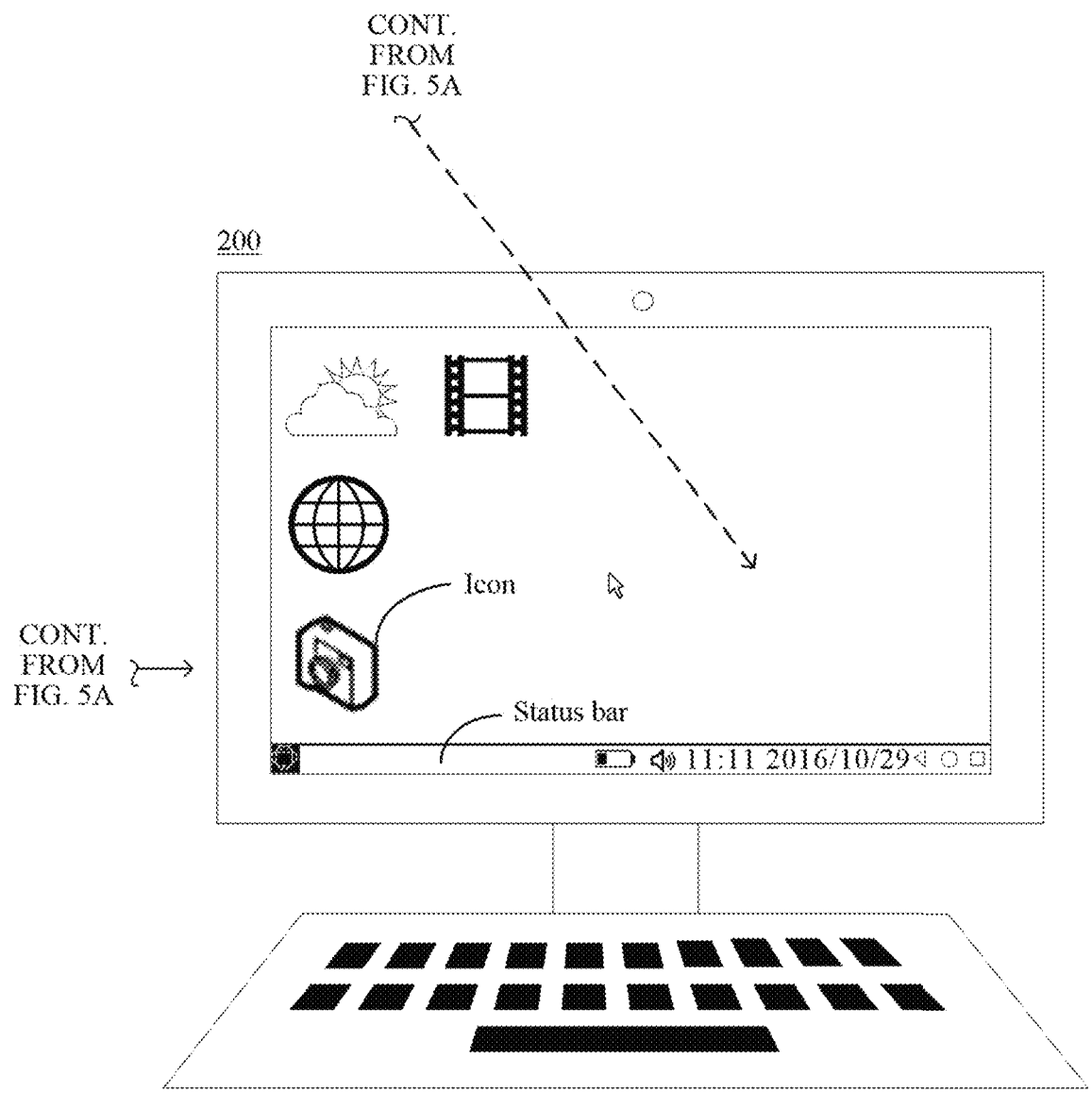

As shown in FIG. 5A and FIG. 5B, when the first terminal 100 projects an application installed on the first terminal onto the display of the second terminal 200 through multi-source display, the first terminal 100 stores generated to-be-displayed display content 1 in a screen container 1 of a memory before the first terminal 100 establishes the connection to the second terminal 200. In this way, the display of the first terminal 100 may display a related image by reading the display content 1 in the screen container 1.

After the first terminal 100 establishes the connection to the second terminal 200, the first terminal 100 may identify related specification information of the display of the second terminal 200 connected to the first terminal, for example, resolution and dots per inch (Dots Per Inch, DPI) of the display of the second terminal 200. In this case, the first terminal 100 may establish an independent screen container, namely, a screen container 2 in FIG. 5A and FIG. 5B for the second terminal 200 in the memory of the first terminal based on the specification information of the display of the second terminal 200. Different display identifiers (Display ID) may be used to distinguish between the screen container 2 and the screen container 1.

Still as shown in FIG. 5A and FIG. 5B, after the first terminal 100 establishes the connection to the second terminal 200, the first terminal 100 may initialize the display of the second terminal 200, convert information such as an application icon of the first terminal 100 into desktop display content such as an application icon, an icon layout, or a status bar that matches the specification information of the second terminal 200 to store the desktop display content in the screen container 2, and send the display content in the screen container 2 to the display of the second terminal 200. In this way, the display of the second terminal 200 may independently project all applications installed on the first terminal 100 onto the display of the second terminal 200 by reading the desktop display content stored in the screen container 2, so as to complete an initialization process of the display of the second terminal 200. Then, the first terminal 100 and the second terminal 200 may independently run two display interfaces in a same operating system by reading display content in respective screen containers.

Certainly, in a multi-source projection system shown in FIG. 5A and FIG. 5B, the display content in the screen container 1 may be the same as the display content in the screen container 2 (for example, both the display content in the screen container 1 and the display content in the screen container 2 are video pictures that are being played). Alternatively, the first terminal 100 may convert the display content in the screen container 1 into display content that matches the specification information of the second terminal 200, to store the display content in the screen container 2 (for example, adjust a resolution value of a picture A in the screen container 1 to a resolution value that matches the display of the second terminal 200, and store the converted picture A in the screen container 2). In this way, based on the foregoing multi-source display principle, the display content in the display of the first terminal 100 may be also synchronously displayed in the display of the second terminal 200.

It should be noted that the foregoing screen container may be specifically an application stack established when a terminal (for example, the first terminal) runs an application. Usually, content of a stack top of the application stack is content that is being run and displayed on the terminal. For example, when an application A is run, a plurality of tasks (task) are generated in an application stack of the application A, and the terminal starts to execute each task from a stack top, and outputs an execution result of each task to a display of the terminal for display.

In addition, when the second terminal 200 displays the display content in the screen container 2 on a second display interface, the first terminal 100 may adjust the display content in the screen container 2 and a display layout of the display content on the second display interface based on a parameter such as screen resolution of the second terminal 200 or an operation habit of a user to use the second terminal 200, for example, may adjust a size, a location, and an icon of the display content. This is not limited in this embodiment of this application.

302. The second terminal obtains a screen locking operation triggered by a user on the second terminal.

After the first terminal establishes the connection to the second terminal, the first terminal may project the display content of the display of the first terminal onto the display of the second terminal based on the single-source display principle shown in FIG. 4A and FIG. 4B. Alternatively, the first terminal may project the display content of the screen container 2 onto the display of the second terminal based on the multi-source display principle shown in FIG. 5A and FIG. 5B. Therefore, if the user needs to lock a screen of the second terminal, for example, when the user needs to temporarily leave the second terminal and does not want other people to read the display content on the second terminal, the user may trigger the screen locking operation on the second terminal.

Figure 6:
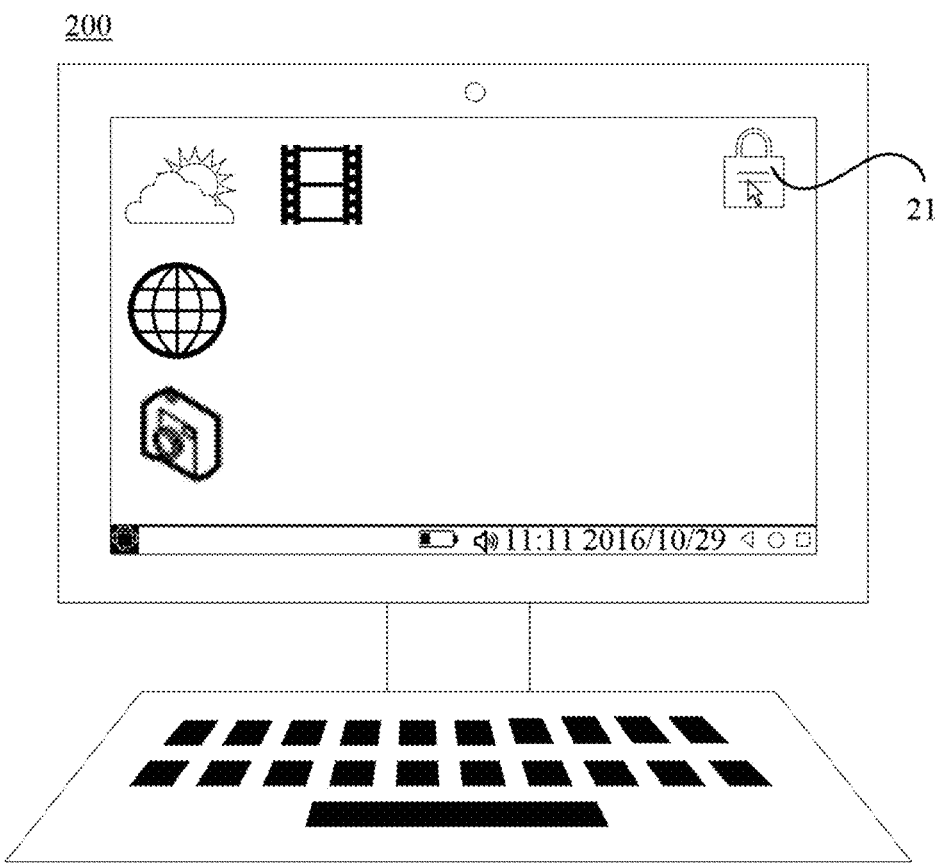
FIG. 6 is a schematic diagram 1 of an application scenario of a screen locking method according to an embodiment of this application.

For example, as shown in FIG. 6, the second terminal 200 is a desktop computer. When the second terminal 200 is in a screen-locked state, a screen locking button 21 may be disposed on a display interface of the second terminal 200, and the screen locking button 21 is for triggering locking of the screen of the second terminal. Therefore, if it is detected that the user taps the screen locking button 21 by using a mouse, the second terminal 200 obtains the screen locking operation triggered by the user on the second terminal 200.

The screen locking button 21 may be also disposed on a status bar or another location of the second terminal 200. This is not limited in this embodiment of this application.

Alternatively, when the display of the second terminal 200 has a touch function, the screen locking operation may also be a gesture such as tapping, sliding, or floating touch.

303. In response to the screen locking operation, the second terminal loads a screen locking window that covers a current display window, so that the second terminal enters a screen-locked state.

In this embodiment of this application, independent screen locking windows are disposed on the first terminal 100 and the second terminal 200. Therefore, after obtaining the screen locking operation, the second terminal 200 may load a screen locking window on the current display window of the second terminal 200, and the screen locking window covers a currently running application. In this case, the second terminal 200 presents a screen-locked interface.

A priority of the screen locking window is higher than a priority of any application of the second terminal 200. To be specific, the loaded screen locking window covers an application window that is being displayed, and a new application window may be shielded by the screen locking window when being started on the second terminal 200, unless the user performs unlocking to remove the screen locking window.

In this way, when the first terminal 100 is in a screen-unlocked state, triggering the screen locking operation on the second terminal 200 by the user may also enable the second terminal 200 to enter the screen-locked state. In this case, in a single-source display scenario shown in FIG. 4A and FIG. 4B, display content in an application running on the first terminal 100 is not projected onto the screen of the second terminal 200, so as to avoid a case in which user privacy displayed on the first terminal 100 is disclosed after being projected onto the second terminal 200. In a multi-source display scenario shown in FIG. 5A and FIG. 5B, the display content that is in the screen container 2 of the first terminal 100 and that is originally presented on the second terminal 200 is not disclosed.

For example, as shown in (a) in FIG. 7, after entering the screen-locked state, the second terminal 200 may display a screen-unlocked interface. If entering a correct unlocking password, the user may unlock the screen of the second terminal 200. Otherwise, the second terminal 200 cannot display the display content projected by the first terminal 100. Alternatively, as shown in (b) in FIG. 7, after the second terminal 200 enters the screen-locked state, a magazine screen locking function may be triggered, and different screen-locked patterns are displayed on the display of the second terminal 200, Similarly, before the screen of the second terminal 200 is not locked, the second terminal 200 cannot display the display content projected by the first terminal 100.

In another possible design method, an embodiment of this application provides a screen locking method. As shown in FIG. 8, the method includes the following steps.

401. A first terminal establishes a connection to a second terminal.

For a method in which the first terminal establishes the connection to the second terminal, refer to the related description in step 301. Details are not described herein again.

After establishing the connection, the first terminal may send to-be-displayed display data in the foregoing screen container 2 to the second terminal, so that the second terminal presents a first interface in a display of the second terminal. In this case, the first terminal may present a second interface in a display of the first terminal by reading display content in the foregoing screen container 1. The first interface may be different from the second interface. For example, an interface of an application WeChat is run on the display of the first terminal, and an interface of a video application is run on the display of the second terminal.

402. When the first terminal is in a screen-unlocked state, obtain a first screen locking operation triggered by a user on the first terminal.

403. The first terminal sends a screen locking instruction to the second terminal in response to the first screen locking operation, so that the second terminal enters a screen-locked state.

Figure 9:
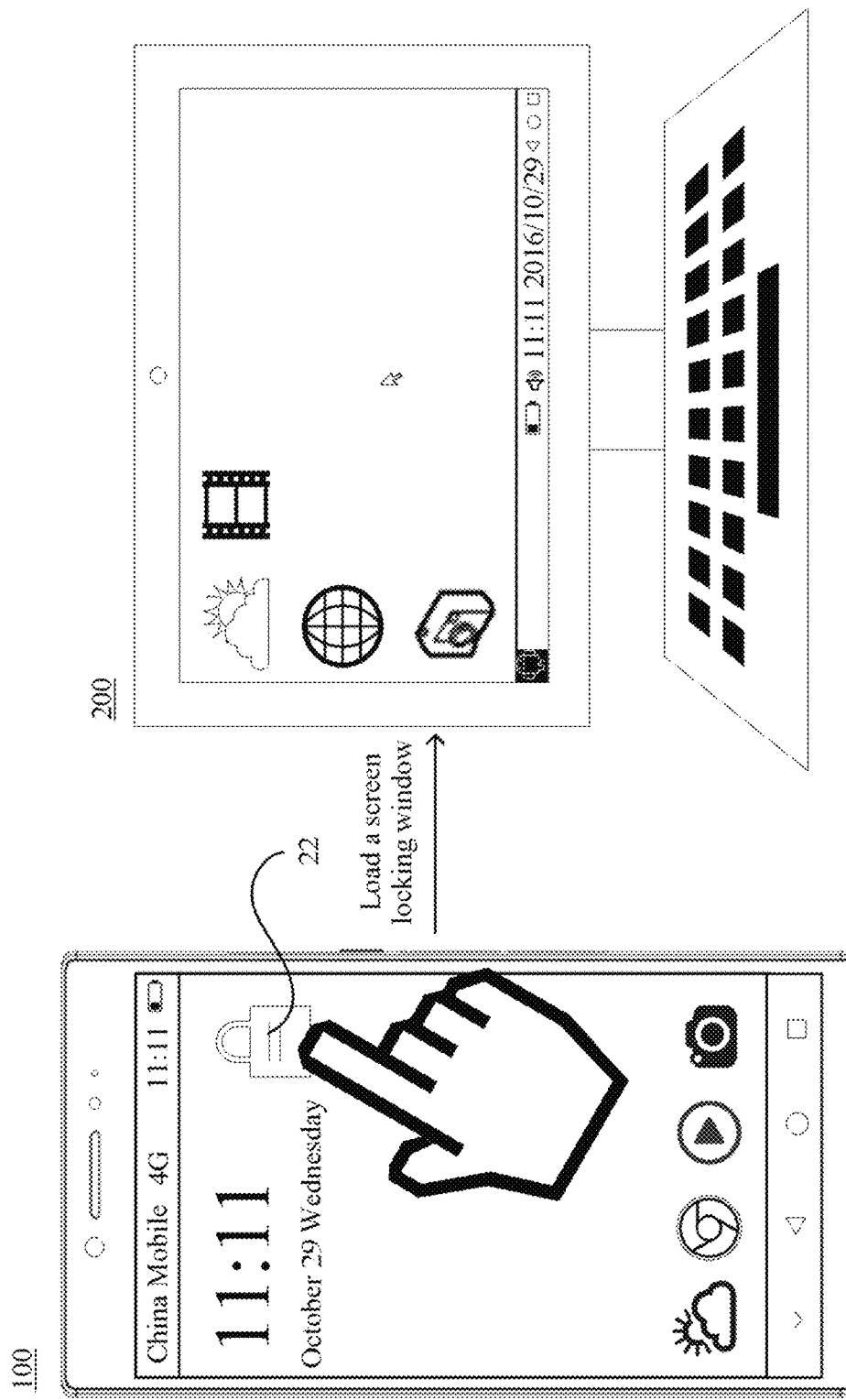
FIG. 9 is a schematic diagram 3 of an application scenario of a screen locking method according to an embodiment of this application.

The first screen locking operation is used to instruct to lock a screen of the second terminal. For example, as shown in FIG. 9, when the first terminal 100 is in a screen-unlocked state, a screen locking button 22 for locking the screen of the second terminal 200 may be disposed on a display interface of the first terminal 100. In this case, the first screen locking operation may be specifically tapping the screen locking button 22, double-tapping the screen locking button 22, dragging the screen locking button 22 to a specified area, a floating touch gesture, or the like. This is not limited in this embodiment of this application.

Certainly, a correspondence between a screen locking instruction and a specified gesture such as a sliding operation may also be preset on the first terminal 100. In this case, there is no need to dispose the screen locking button 22 on the display interface of the first terminal 100. Once it is detected that the user performs the foregoing specified gesture on the first terminal 100, the first terminal 100 sends the screen locking instruction to the second terminal 200.

Figure 10:
FIG. 10 (a), FIG. 10 (b), and FIG. 10 (c) are a schematic diagram 4 of an application scenario of a screen locking method according to an embodiment of this application.
Figure 10:
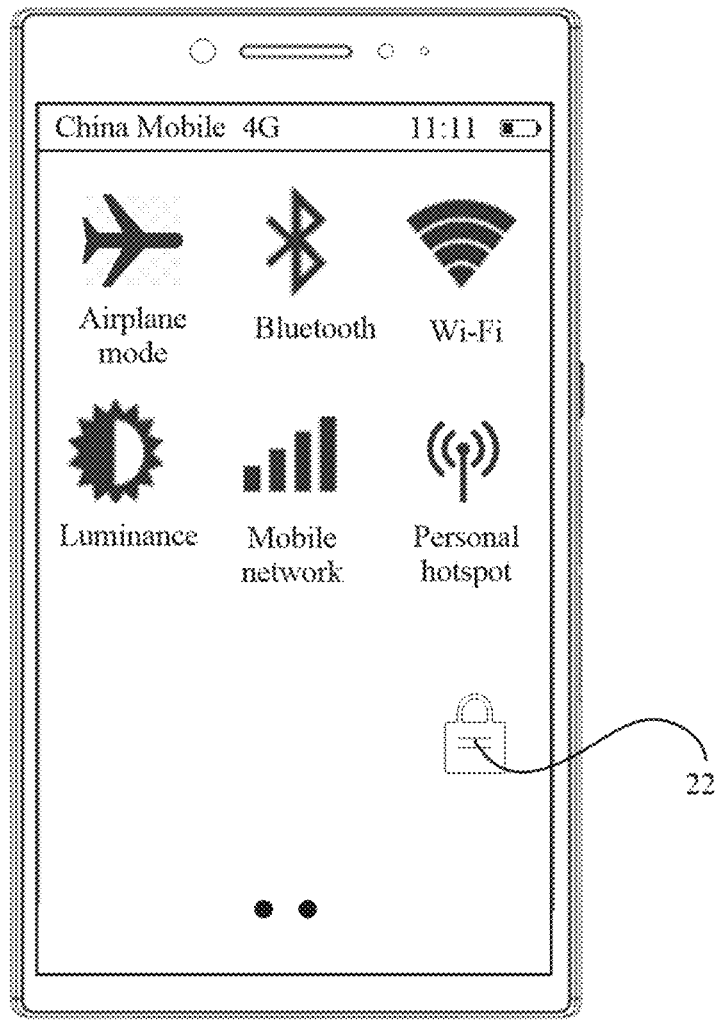
Figure 10:
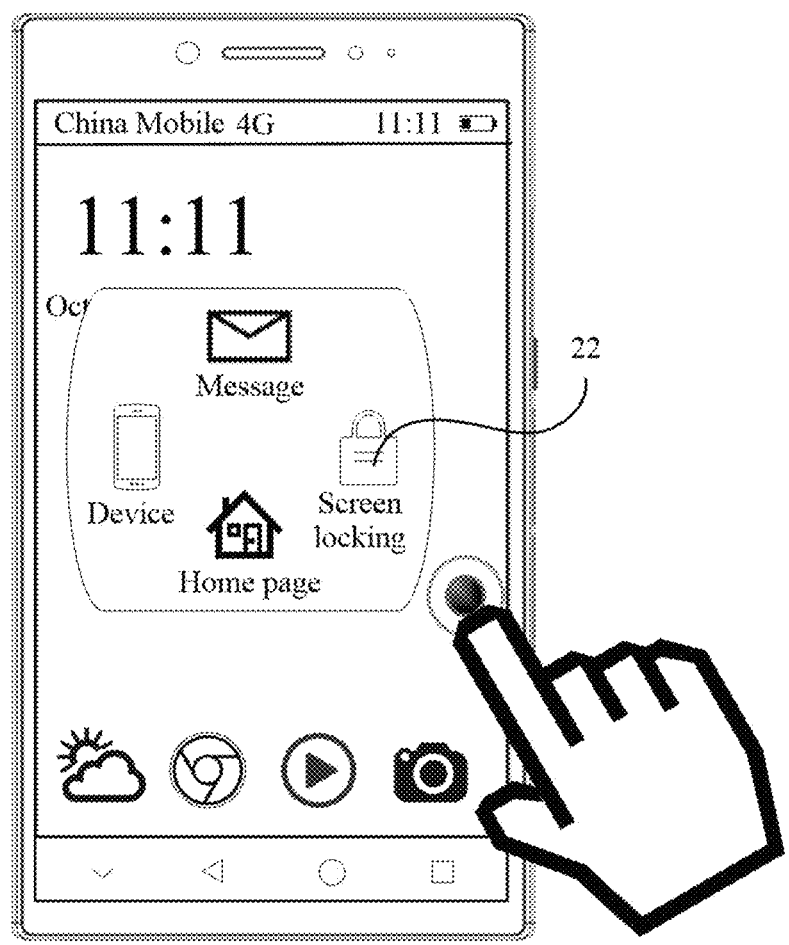

For example, as shown in FIG. 10 (a), the screen locking button 22 may be disposed on a desktop of the first terminal 100. Alternatively, as shown in FIG. 10 (b), the screen locking button 22 may be disposed in a drop-down or pull-up list of the first terminal 100. Alternatively, as shown in FIG. 10 (c), after the user taps a suspend button on the first terminal 100, the screen locking button 22 may be disposed in a suspend list triggered by the suspend button. In addition, the user may customize a specific implementation of the first screen locking operation on a setting interface. This is not limited in this embodiment of this application.

In a possible design method, the display of the second terminal 200 has a function of loading a screen locking window. Therefore, after the second terminal 200 receives the screen locking instruction, the display of the second terminal 200 may load, on a display interface of the second terminal, a screen locking window that covers a current display window. In this case, the display of the second terminal 200 presents a screen-locked interface, and the second terminal 200 enters the screen-locked state.

In another possible design method, the screen locking instruction sent by the first terminal 100 carries screen-locked interface data. Therefore, after receiving the screen locking instruction, the second terminal 200 may load, on a display interface of the second terminal based on the screen-locked interface data carried in the screen locking instruction, a screen locking window that covers a current display window. In this case, the display of the second terminal 200 presents a screen-locked interface, and the second terminal 200 enters the screen-locked state.

For example, as shown in FIG. 11, with reference to the multi-source display principle shown in FIG. 5A and FIG. 5B, the display of the first terminal 100 displays display content 1, and the display of the second terminal 200 displays display content 2. As shown in FIG. 11, after the first terminal 100 detects the first screen locking operation, the first terminal 100 may be triggered to load a screen locking window in the screen container 2, and the screen locking window covers the display content 1 that is being displayed in the screen container 2. For example, when the screen container 2 is an application stack, the screen locking window may be loaded on a stack top of the application stack. In this way, as shown in FIG. 11, the first terminal 100 first adds the screen locking window on the stack top to the screen locking instruction as the screen-locked interface data, and sends the screen-locked interface data to the second terminal 200, so as to load the screen locking window that covers the current display interface on the display interface of the second terminal 200.

A priority of the screen locking window is higher than a priority of any application of the second terminal 200. To be specific, the loaded screen locking window covers an application window that is being displayed, and a new application window may be shielded by the screen locking window when being started on the second terminal 200, unless the user performs unlocking to remove the screen locking window in this case, as shown in FIG. 12, the first terminal 100 is still in the screen-unlocked state, the user may still perform an operation on the first terminal 100, and the display content such as user privacy displayed on the first terminal 100 is not projected onto the display of the second terminal 200.

In another possible design method, before the first terminal establishes the connection to the second terminal, the first terminal may present a first interface (for example, an interface for reading a document A) when a first application is run. After the first terminal establishes the connection to the second terminal, the first terminal may send to-be-displayed display content in the screen container 2 to the second terminal, so that the second terminal presents a second interface. In this case, the second interface and the first interface may be the same or different. This is not limited in this embodiment of this application.

Then, when the first terminal jumps from the first interface to a third interface that includes an interface element associated with a second application, for example, when the first terminal jumps from the display interface of the document A to a chatting interface of the application WeChat (the second application) or when the first terminal receives a new SMS message (the second application) and displays a notification bar of the SMS message on the display interface of the document A, related content of the second application may be synchronously displayed on the display of the second terminal, and the content may include user privacy or content that the user does not want other people to read. Therefore, the first terminal may automatically send the screen locking instruction to the second terminal, so that the second terminal enters the screen-locked state.

In this way, the first terminal may automatically lock the screen of the second terminal in an application scenario that relates to user privacy, and therefore the second terminal may enter the screen-locked state without requiring the user to manually trigger a screen locking process for the second terminal, thereby improving intelligent human-computer interaction.

The foregoing third interface is a display interface on which the interface element associated with the second application (the second application is different from the first application) is presented. For example, the interface element may be specifically information such as a character, a picture, or a video that is displayed when the second application (for example, a document application) is run, or may be information such as a notification message, a character, a picture, or a video that is received by the second application (for example, an instant messaging application), or may be a program icon (for example, a caller ID display icon) when the second application is run. This is not limited in this embodiment of the present invention.

In a possible design method, the first terminal that originally runs the first application may switch to running the second application. In this case, the display interface of the first terminal jumps from the first interface to the third interface, and the third interface presents only the interface element of the second application. For example, the third interface is a caller ID display interface or a chatting interface of WeChat. Because the interface element of the second application that is presented on the third interface may be synchronously displayed on the display of the second terminal, and the content may include user privacy or content that the user does not want other people to read, the first terminal may automatically send the screen locking instruction to the second terminal, so that the second terminal enters the screen-locked state.

In another possible design method, when the first terminal jumps from the first interface on which the first application is run to the third interface, only a part of the third interface possibly presents the interface element of the second application. For example, the first terminal receives a notification message of an SMS message (the second application) while running the first application, and the notification message is overlaid on a running interface of the first application in a form of a message notification bar. Similarly, the notification message may be also synchronously displayed on the display of the second terminal, and the content may include user privacy or content that the user does not want other people to read. Therefore, the first terminal may automatically send the screen locking instruction to the second terminal, so that the second terminal enters the screen-locked state.

Figure 13:
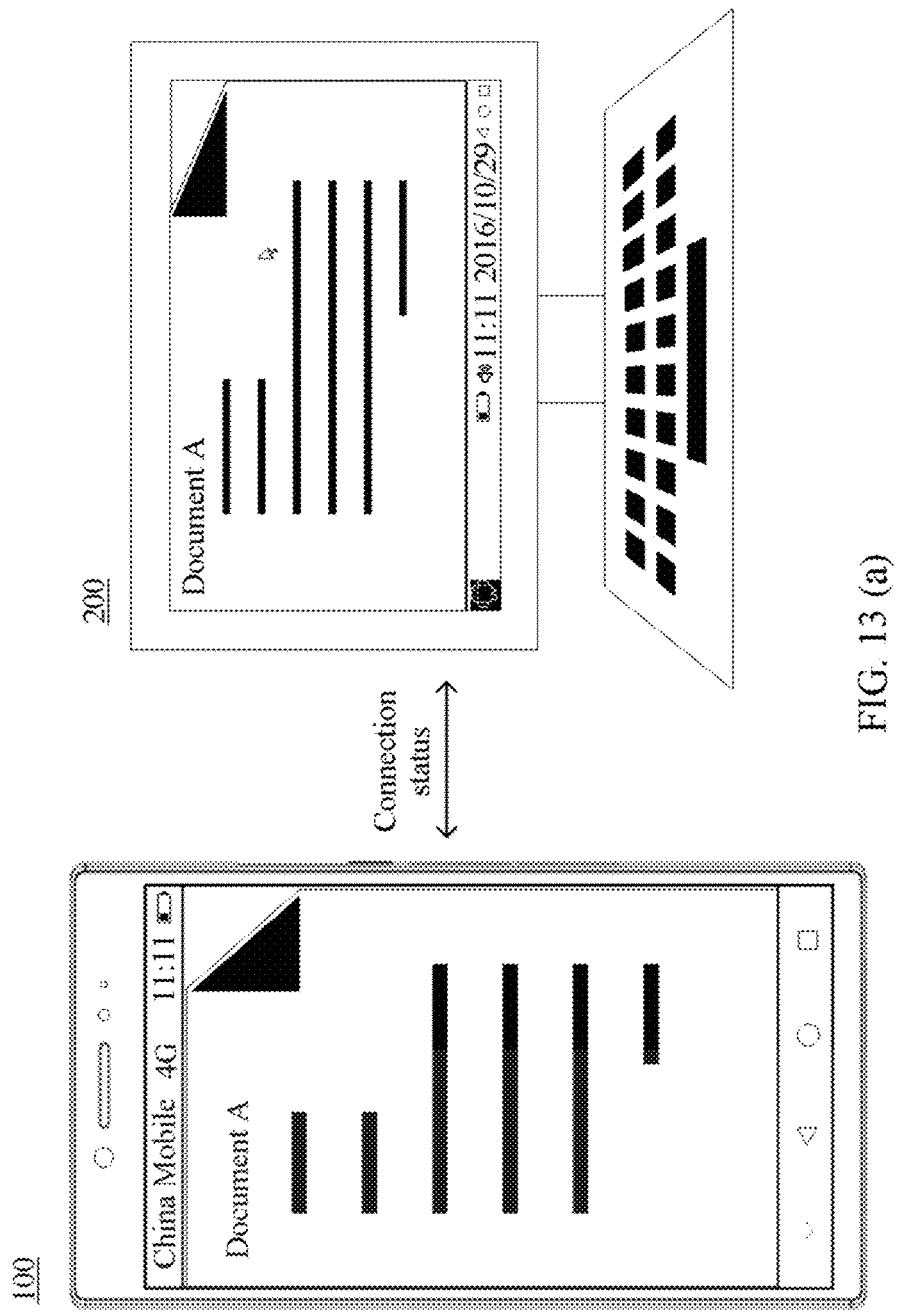
FIG. 13 (a), FIG. 13 (b), and FIG. 13 (c) are a schematic diagram 7 of an application scenario of a screen locking method according to an embodiment of this application.
Figure 13:
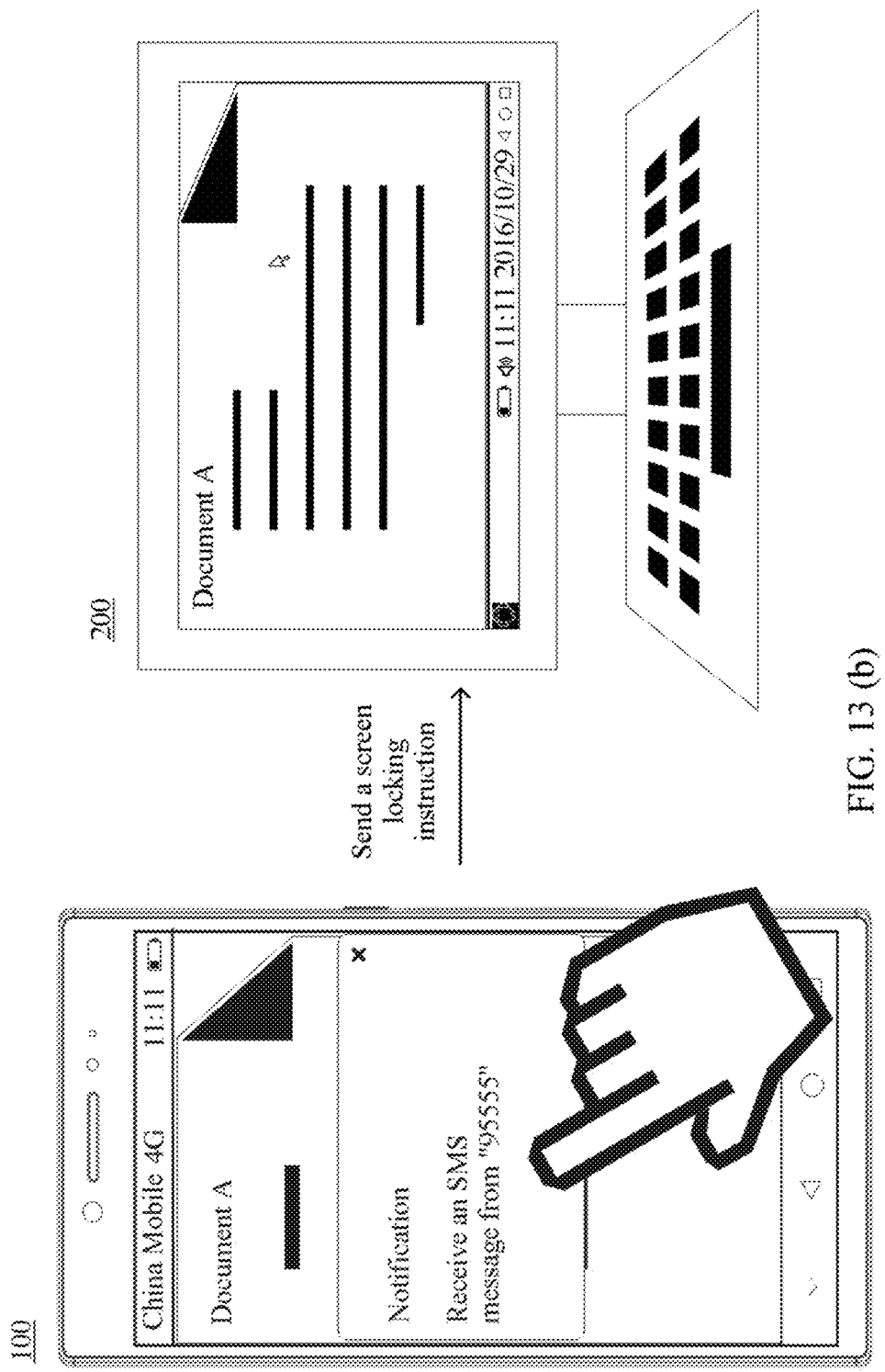
Figure 13:
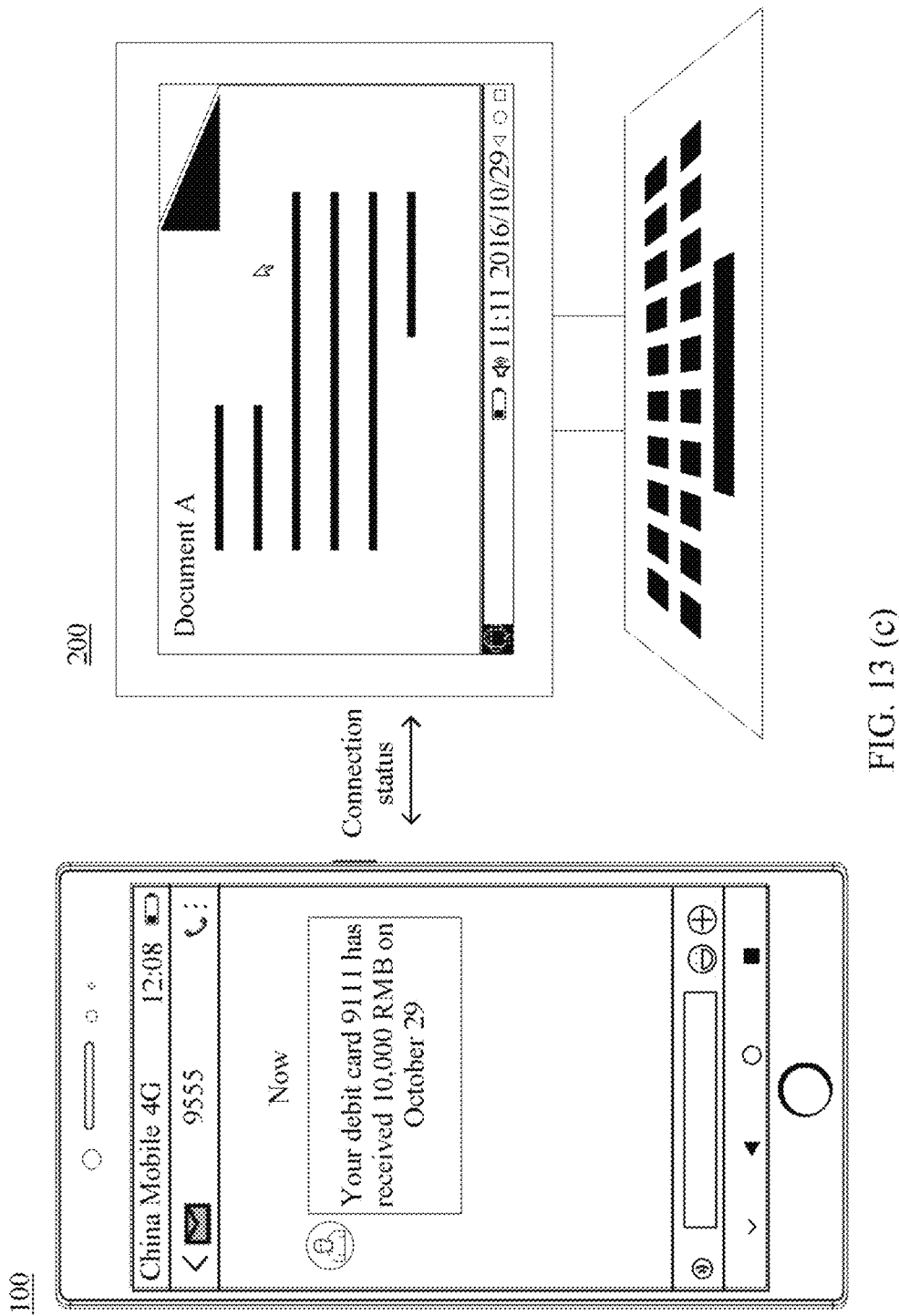

For example, as shown in FIG. 13 (a), after establishing the connection to the second terminal 200, the first terminal 100 may project the document A that is being displayed onto the display of the second terminal 200 for synchronous display. Certainly, based on the multi-source display principle shown in FIG. 5A and FIG. 5B, the display of the second terminal 200 may also display another interface in addition to the document A. This is not limited in this embodiment of this application.

Further, as shown in FIG. 13 (b), the first terminal 100 may receive a new SMS message. Therefore, if the first terminal 100 detects that the display interface of the document A displays a notification message of the new SMS message (for example, a message notification bar of the new SMS message), a related interface element of the SMS message application may be synchronously displayed on the display of the second terminal 200. Therefore, to avoid user privacy disclosure, the first terminal 100 may be triggered to automatically load the screen locking interface on the display interface of the second terminal 200, so that the second terminal 200 enters the screen-locked state.

In this case, as shown in FIG. 13 (c), the second terminal 200 may use, as a screen-locked interface, an image of the document A that is being displayed, and the user may read a received new SMS message on the first terminal.

Then, when the user exits the SMS message application on the first terminal 100, or when display of the notification message of the SMS message on the display interface of the first terminal is stopped, the first terminal may switch to the interface of the document A again. In this case, the first terminal 100 may be triggered to remove the screen locking window loaded on the second terminal 200. In this way, a process of seamless display of the document A on the second terminal 200 is implemented while user privacy disclosure generated by using the second terminal 200 is avoided, thereby improving user experience when the user performs screen sharing.

Figure 14:
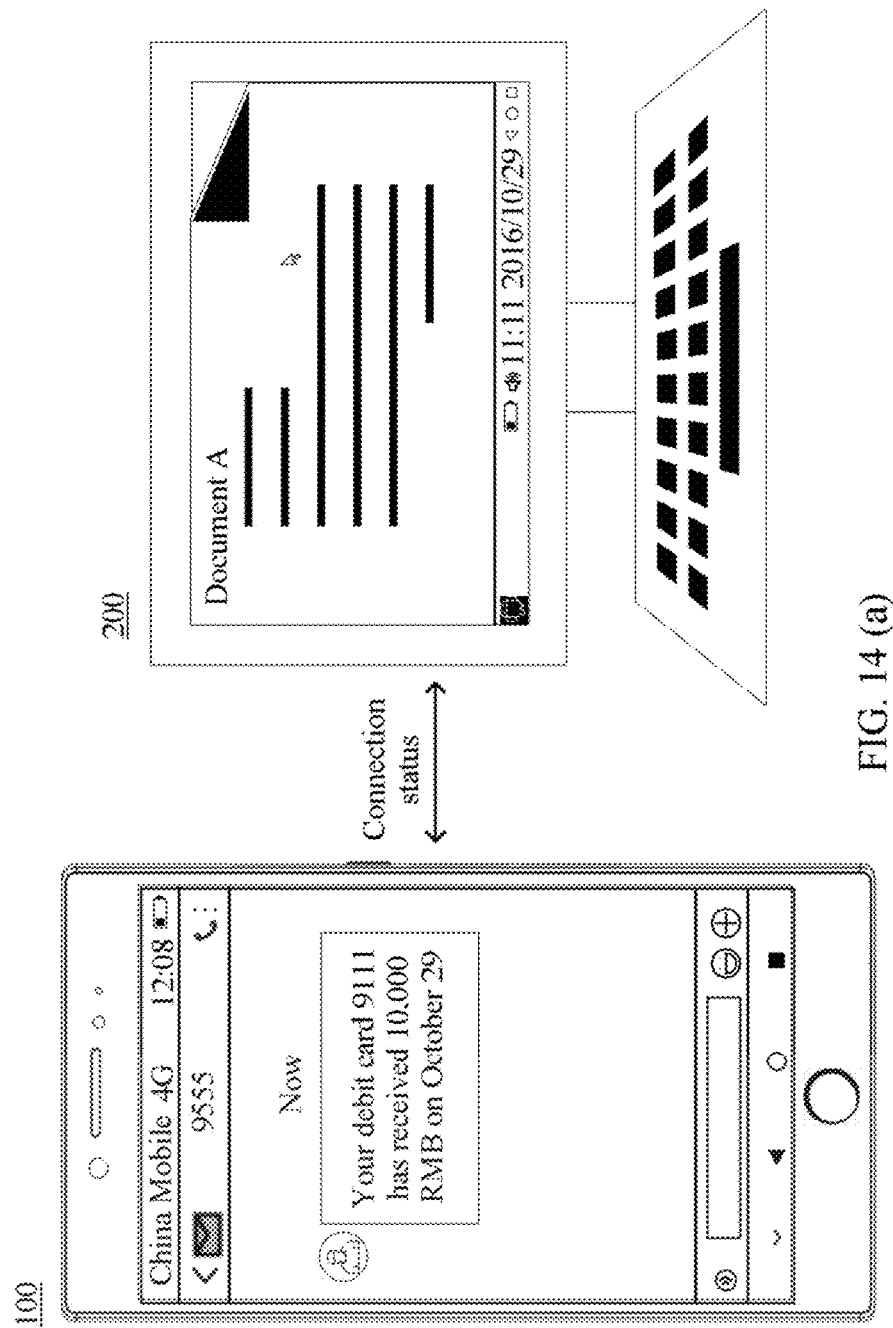
FIG. 14 (a), FIG. 14 (b), and FIG. 14 (c) are a schematic diagram 8 of an application scenario of a screen locking method according to an embodiment of this application.
Figure 14:
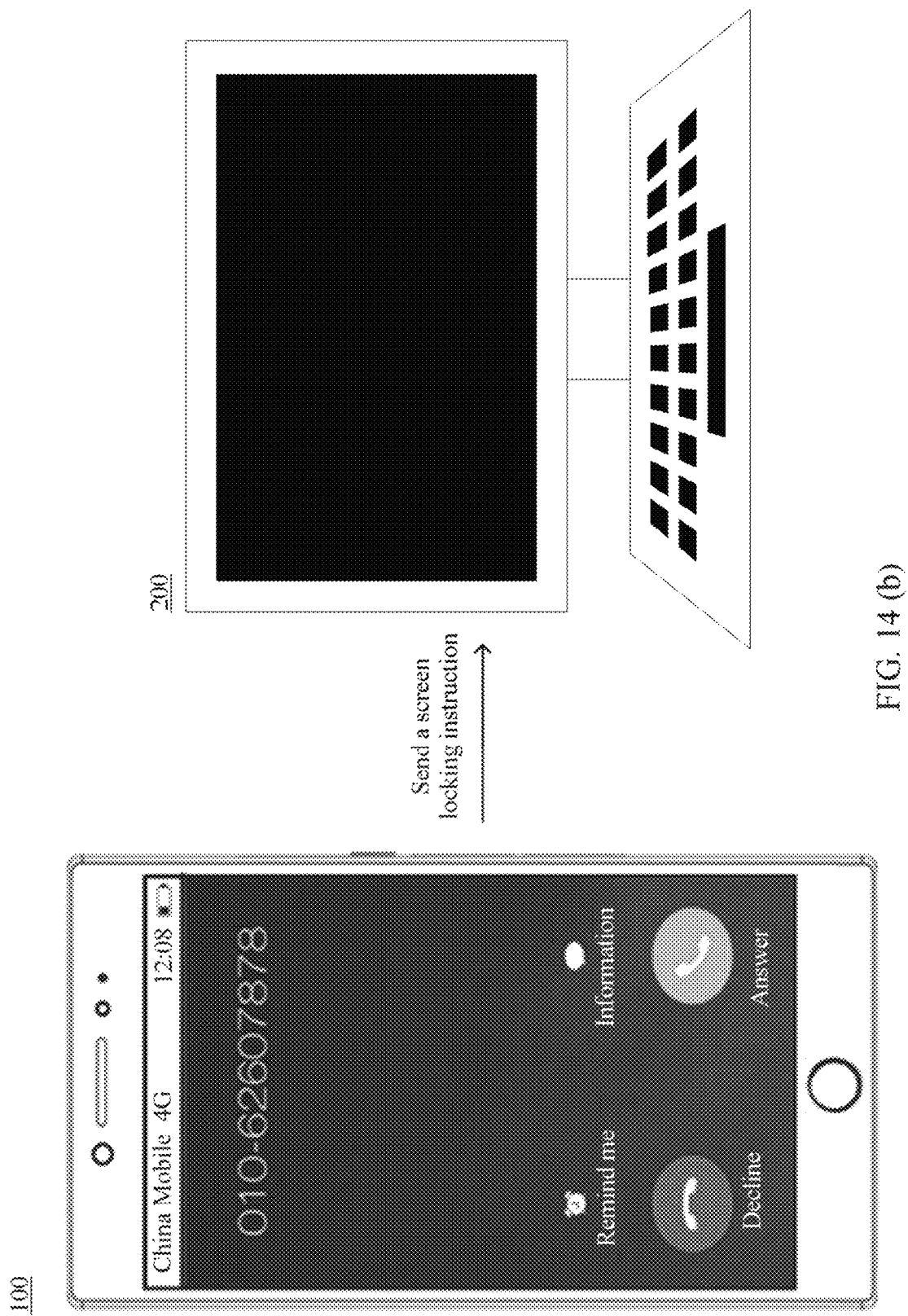
Figure 14:
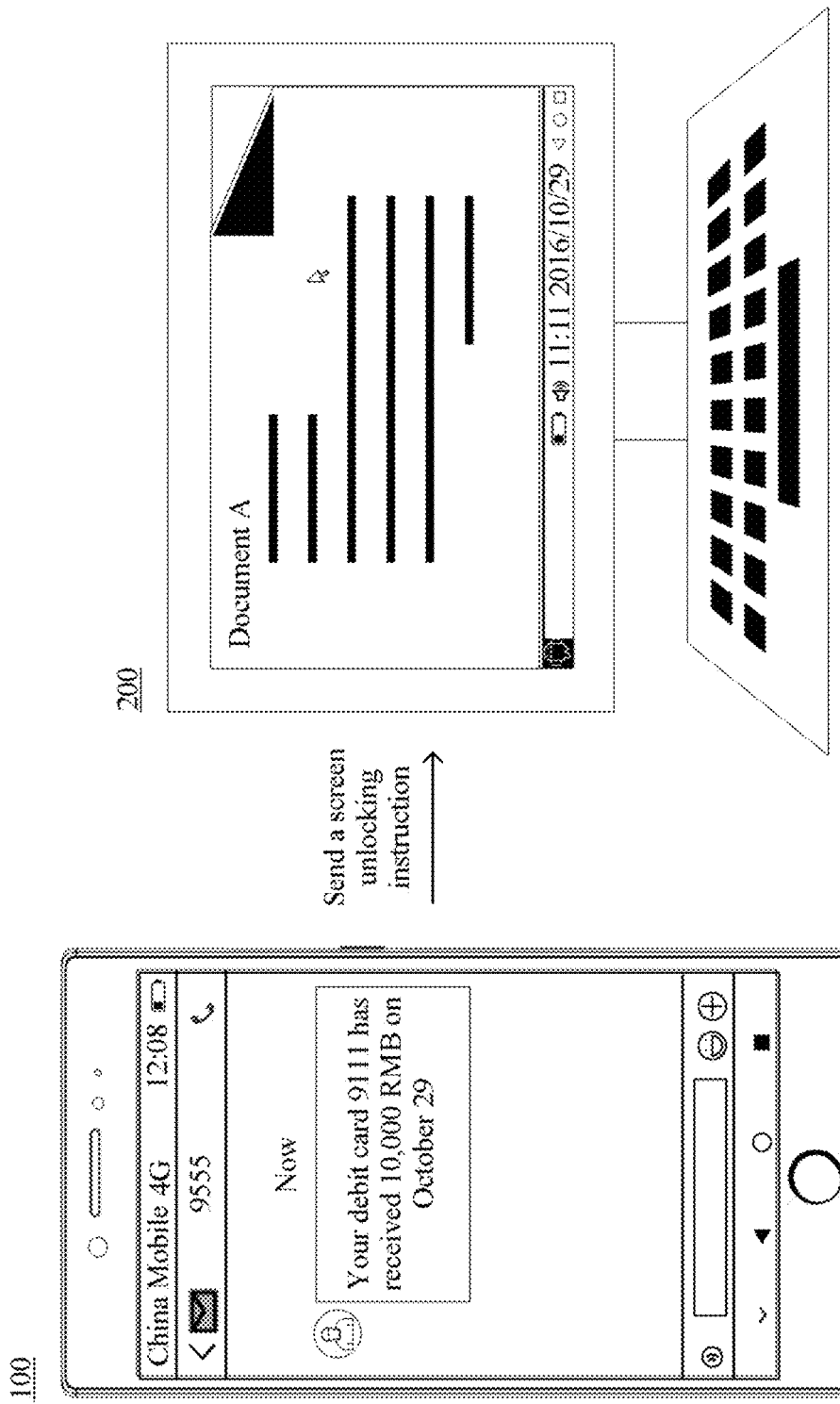

For another example, as shown in FIG. 14 (a), after the first terminal 100 establishes the connection to the second terminal 200, an SMS message application may be run on the display interface of the first terminal 100, and the interface of the document A may be displayed on the display interface of the second terminal 200. Further, as shown in FIG. 14 (b), when the first terminal 100 receives a new incoming call, the display interface of the first terminal automatically jumps to a caller ID display interface, and the caller ID display interface may include user privacy such as a name or a phone number. If the caller ID display interface is synchronously displayed on the display of the second terminal 200, user privacy disclosure is caused. Therefore, when the first terminal displays the caller ID display interface, the first terminal 100 may be triggered to automatically load the screen locking window on the display interface of the second terminal 200, so that the second terminal 200 enters the screen-locked state. After the first terminal exits the caller ID display interface, for example, as shown in FIG. 14 (c), when the first terminal switches back to the SMS message application and displays an interface of the SMS message application, the first terminal 100 may be triggered to automatically send a screen unlocking instruction to the second terminal 200 to remove the screen locking window loaded on the second terminal 200, so that the second terminal 200 enters a screen-unlocked state.

In this way, in an application scenario that relates to user privacy, the first terminal may automatically lock the screen of the second terminal; in an application that does not relate to user privacy, the first terminal may automatically unlock the screen of the second terminal, so as to improve intelligent human-computer interaction while avoiding user privacy disclosure.

The second application may be manually set by the user on the first terminal, or may be automatically set by the first terminal based on application reading permission. For example, an application in which reading an SMS message or a photo of the user is allowed is set as the second application. This is not limited in this embodiment of this application.

Figure 15:
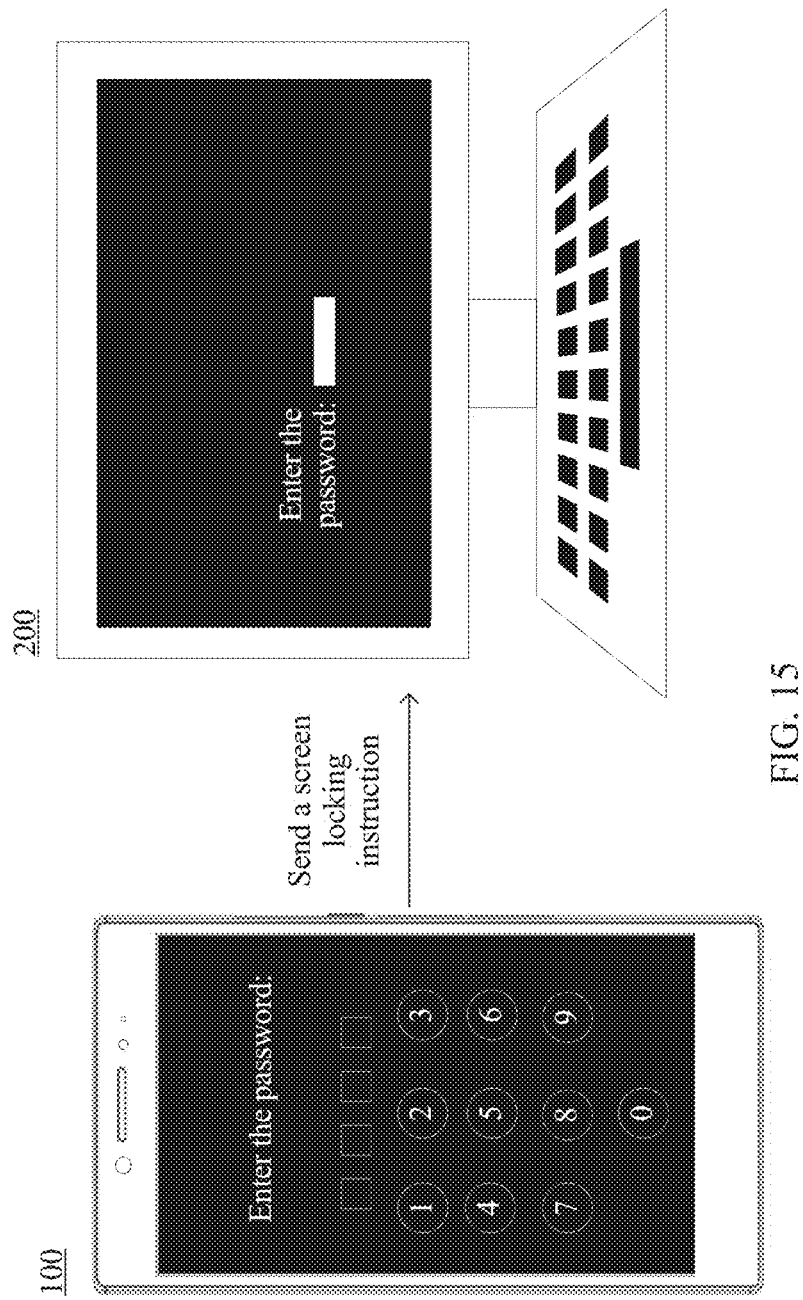
FIG. 15 is a schematic diagram 9 of an application scenario of a screen locking method according to an embodiment of this application.

In another possible design method, after the first terminal 100 establishes the connection to the second terminal 200, if the first terminal 100 obtains a second screen locking operation triggered by the user and used to lock the screen of the first terminal, for example, pressing a power button, as shown in FIG. 15, the first terminal 100 loads the screen locking window on the display interface of the first terminal, and the first terminal 100 is further triggered to send the screen locking instruction to the second terminal 200 to load the screen locking window on the display interface of the second terminal 200, so that the second terminal 200 enters the screen-locked state. In other words, when the screen of the first terminal 100 is locked, the second terminal 200 is triggered to perform a screen locking operation, so as to ensure that the second terminal 200 that shares the screen with the first terminal 100 does not disclose information on the first terminal 100 when the first terminal 100 is in a screen-locked state.

For example, by using a mobile phone as the first terminal 100, when the user does not operate the mobile phone for a long time, the mobile phone automatically enters a screen-off state, and in the screen-off state, backlight may be turned off and a screen may be off for the mobile phone for power saving. However, in this case, the screen of the mobile phone is not locked, and when the mobile phone subsequently receives a user operation, the mobile phone can be normally operated without a need of screen unlocking. When the mobile phone does not receive a user operation within a specific time period in which the mobile phone is in the screen-off state, the mobile phone may automatically enter a screen-locked state.

In this embodiment of this application, when the mobile phone enters the screen-off state, a current screen state of the second terminal 200 may be obtained. If the second terminal 200 does not enter the screen-locked state but normally runs, the mobile phone may continue to keep in the screen-off state for power saving. However, in this case, the mobile phone does not enter the screen-locked state, so as to avoid a problem that normal running of the second terminal 200 is interfered with when the second terminal 200 is triggered to perform a screen locking operation after the screen of the mobile phone is locked.

Certainly, if the mobile phone learns that the second terminal 200 has entered the screen-locked state, the mobile phone may continue to use an existing screen locking mechanism. If the mobile phone does not receive a user operation within a specific time period in which the mobile phone is in the screen-off state, the mobile phone automatically enters the screen-locked state.

Figure 24:
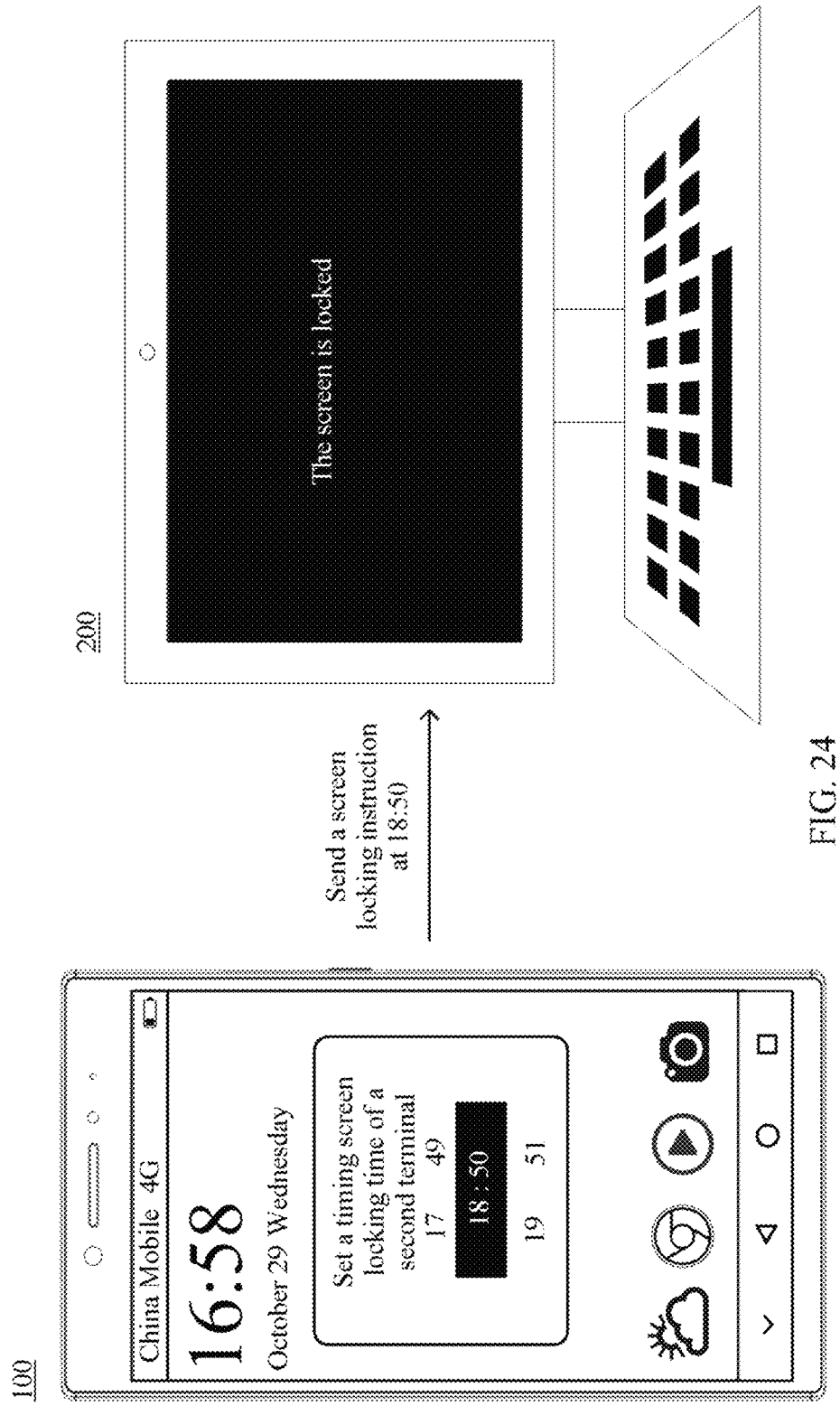
FIG. 24 is a schematic diagram 14 of an application scenario of a screen locking method according to an embodiment of this application.

In some other embodiments of this application, the user may further set a timing screen locking time for the second terminal 200 on the first terminal 100. For example, as shown in FIG. 24, the user may set, on the first terminal 100, that a power-off time of the second terminal 200 is 18:50. Therefore, when 18:50 arrives, the first terminal 100 may send the screen locking instruction to the second terminal 200, so that the second terminal 200 enters the screen-locked state.

Figure 25:
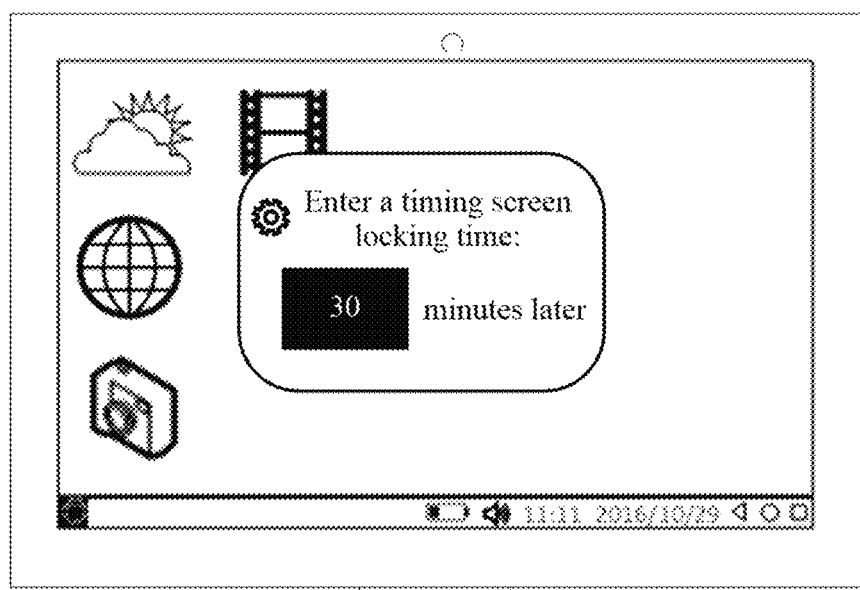
FIG. 25 is a schematic diagram 15 of an application scenario of a screen locking method according to an embodiment of this application.

Alternatively, the user may further set a timing screen locking time for the second terminal 200 on the second terminal 200. For example, as shown in FIG. 25, the user may set, in a timing screen locking function of the second terminal 200, that the screen of the second terminal 200 is locked after half an hour. Therefore, in response to a current setting operation of the user, the second terminal 200 may start a timer with duration of an hour and a half. When the timer expires, the second terminal 200 may be triggered to enter the screen-locked state.

Figure 16:
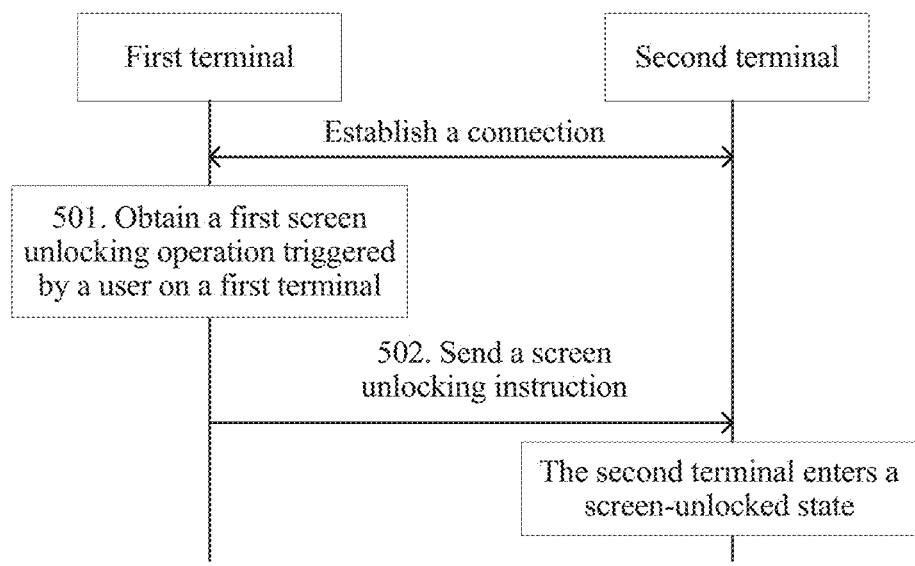
FIG. 16 is a schematic interaction diagram 3 of a screen locking method according to an embodiment of this application.

Further, after the second terminal enters the screen-locked state, an embodiment of this application further provides a screen unlocking method. As shown in FIG. 16, the method includes the following steps.

501. When a first terminal is in a screen-unlocked state, the first terminal obtains a first screen unlocking operation triggered by a user on the first terminal.

Figure 17:
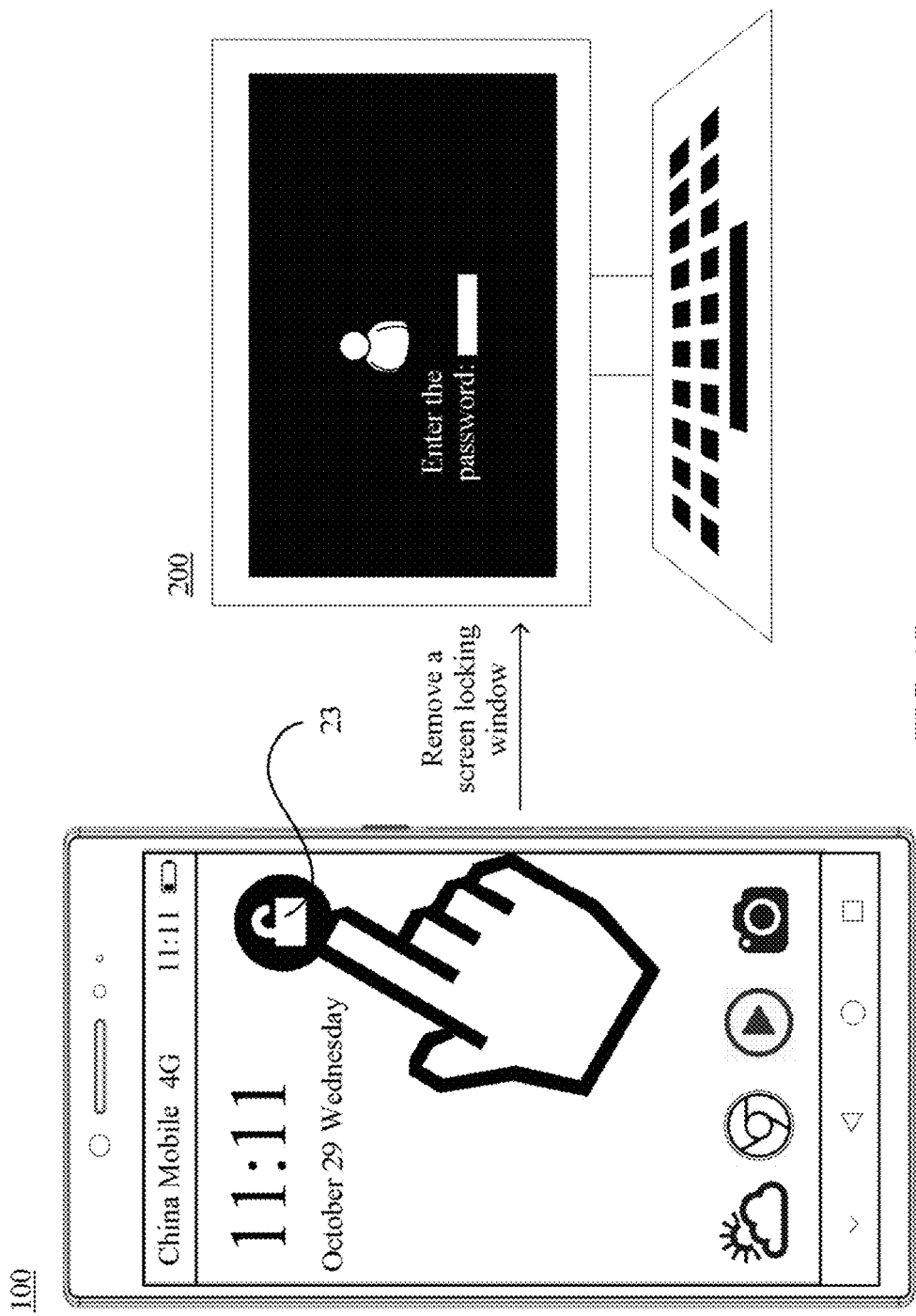
FIG. 17 is a schematic diagram 10 of an application scenario of a screen locking method according to an embodiment of this application.

The first screen unlocking operation is used to instruct to unlock a screen of a second terminal. As shown in FIG. 17, when the second terminal 200 enters the screen-locked state, and the first terminal 100 is in the screen-unlocked state, a screen unlocking button 23 for unlocking the screen of the second terminal 200 may be disposed on a display interface of the first terminal 100. In this case, the first screen unlocking operation may be specifically tapping the screen unlocking button 23, double-tapping the screen unlocking button 23, pressing the screen unlocking button 23, dragging the screen unlocking button 23 to a specified area, a floating touch gesture, or the like. This is not limited in this embodiment of this application.

502. The first terminal sends a screen unlocking instruction to the second terminal in response to the first screen unlocking operation, so that the second terminal enters a screen-unlocked state.

Specifically, still as shown in FIG. 17, after the first screen unlocking operation triggered on the first terminal 100 is detected, the first terminal 100 may remove a screen locking window loaded for the second terminal when the screen of the second terminal 200 is locked. In this case, as shown in FIG. 18, an application window on the second terminal 200 that is originally covered by the screen locking window is displayed on a current display interface, and the second terminal 200 enters the screen-unlocked state.

For example, an example in FIG. 11 is still used for description. When obtaining the first screen unlocking operation triggered by the user on the first terminal 100, the first terminal 100 may delete a screen locking window loaded in a screen container 2 when the screen of the second terminal 200 is locked. In this way, by reading display content in the screen container 2, a display of the second terminal 200 may display, on the current display interface, the application window originally covered by the screen locking window.

Further, after deleting the screen locking window loaded in the screen container 2, the first terminal 100 may further update the display content in the screen container 2, for example, synchronize current display content in a screen container 1 to the screen container 2. In this way, the display of the second terminal 200 may implement a process of synchronous display with the first terminal 100 by reading the display content in the screen container 2.

Figure 18:
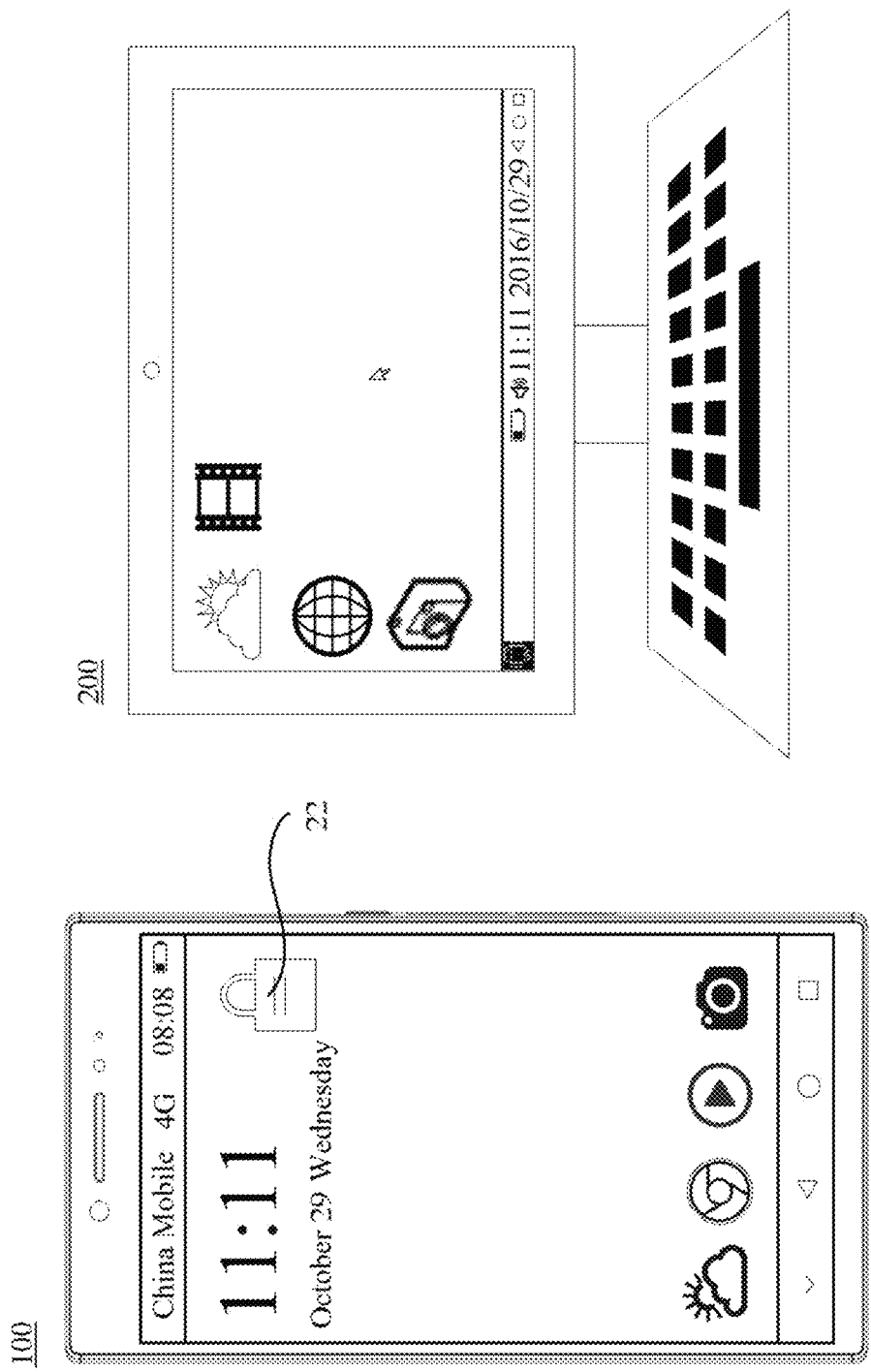
FIG. 18 is a schematic diagram 11 of an application scenario of a screen locking method according to an embodiment of this application.

Further, still as shown in FIG. 18, after the second terminal 200 enters xe screen-unlocked state, a screen locking button 22 for locking the screen of the second terminal 200 may be re-displayed on the display interface of the first terminal 100. In this way, when the user needs to lock the screen of the second terminal 200 again, the second terminal 200 may enter the screen-locked state again by triggering the screen locking button 22 (namely, the first screen locking operation).

Alternatively, as shown in FIG. 17, after the second terminal 200 enters the screen-locked state, if a screen-unlocked interface is displayed on the second terminal 200, the user may further trigger, by entering identity authentication information such as a password or a fingerprint, the second terminal 200 to remove the screen locking window on the current display interface. The password entered by the user on the screen-unlocked interface of the second terminal 200 and an unlocking password of the first terminal 100 may be the same or different. This is not limited in this embodiment of this application.

Correspondingly, after the second terminal enters the screen-locked state, if the first terminal is also in a screen-locked state, the first terminal may obtain a second screen unlocking operation triggered by the user on the first terminal, and the second screen unlocking operation is used to instruct to unlock a screen of the first terminal.

In this case, in response to the second screen unlocking operation, the first terminal removes a screen locking window on a display interface of the first terminal, and there is no need to trigger the first terminal to remove the screen locking window on the current display interface of the second terminal. In this way, a problem that user privacy disclosure is caused by synchronously projecting information such as user privacy displayed on the first terminal onto the display of the second terminal after screen locking windows of the first terminal and the second terminal are simultaneously removed.

Figure 19:
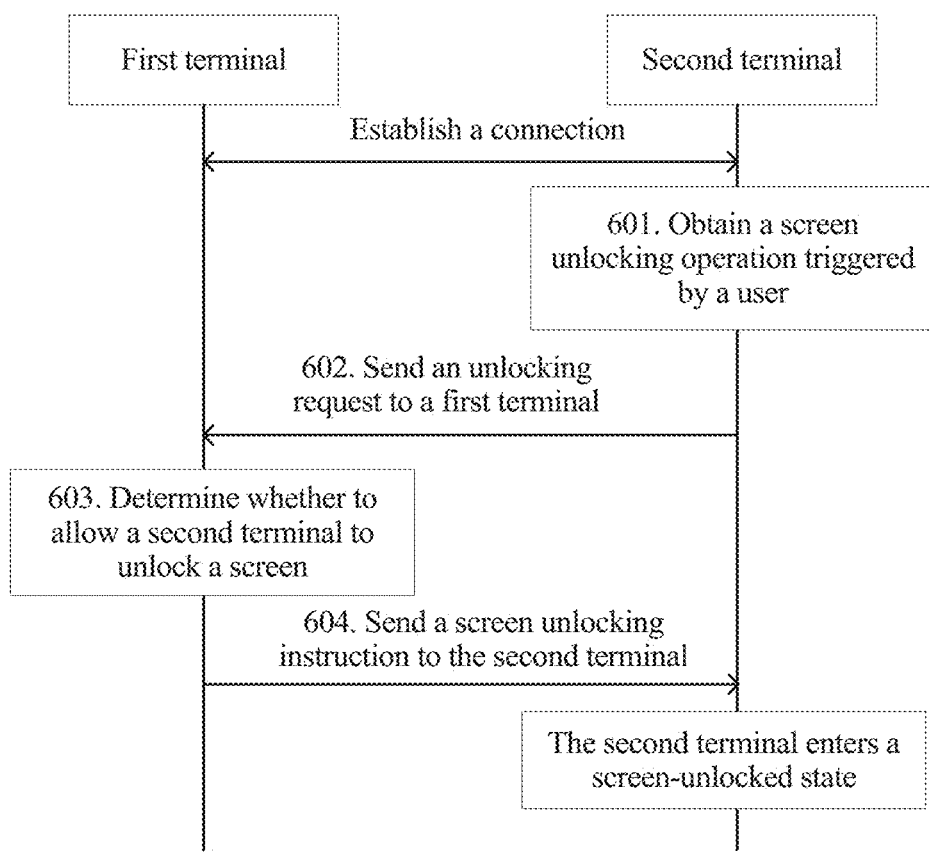
FIG. 19 is a schematic interaction diagram 4 of a screen locking method according to an embodiment of this application.

In another possible design method, after the second terminal enters the screen-locked state, an embodiment of this application further provides a screen unlocking method. As shown in FIG. 19, the method includes the following steps.

601. A second terminal obtains a screen unlocking operation triggered by a user, where the screen unlocking operation is used to instruct to unlock a screen of the second terminal.

Figure 20:
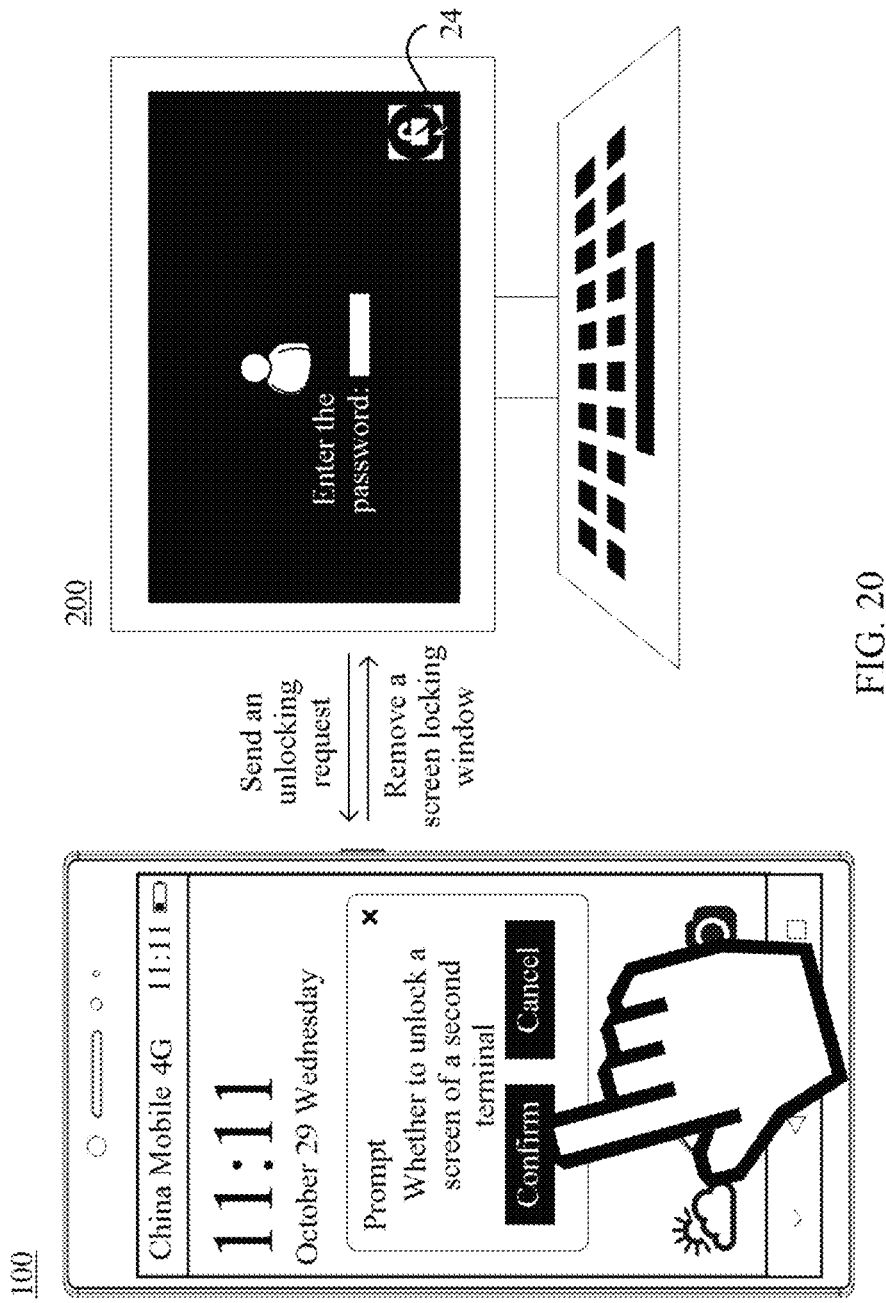
FIG. 20 is a schematic diagram 12 of an application scenario of a screen locking method according to an embodiment of this application.

For example, as shown in FIG. 20, when the second terminal 200 is in a screen-locked state, a screen unlocking button 24 may be disposed on a display interface of the second terminal 200, and the screen unlocking button 24 is for triggering unlocking of the screen of the second terminal 200. Therefore, if it is detected that a user taps the screen unlocking button 24 by using a mouse or the like, the second terminal 200 obtains the screen unlocking operation triggered by the user.

602. The second terminal sends an unlocking request to a first terminal in response to the screen unlocking operation.

603. In response to the unlocking request, the first terminal determines whether the second terminal is allowed to unlock the screen.

604. If the second terminal is allowed to unlock the screen, the first terminal sends a screen unlocking instruction to the second terminal, so that the second terminal enters a screen-unlocked state.

Still as shown in FIG. 20, after obtaining the screen unlocking operation triggered by the user on the second terminal 200, the second terminal 200 does not immediately perform the screen unlocking operation, but sends the unlocking request to the first terminal 100. The first terminal 100 determines whether to allow the second terminal 200 to unlock the screen of the second terminal 200.

This is because if any user may trigger, by tapping the screen unlocking button 24 on the second terminal 200, the second terminal 200 to unlock the screen of the second terminal 200, it means that any user may unlock the screen of the second terminal 200. Therefore, the unlocked second terminal 200 may still synchronously display information such as user privacy that is being displayed on the first terminal 100 and consequently user privacy disclosure is caused. Therefore, permission of the first terminal 100 that initiates screen sharing needs to be obtained when the screen of the second terminal 200 is unlocked. As shown in FIG. 20, after the first terminal 100 determines to allow the second terminal 200 to unlock the screen, the first terminal 100 sends a message for allowing screen unlocking to the second terminal 200, so that the second terminal 200 removes a screen locking window on a current display interface based on the message for allowing screen unlocking.

As shown in FIG. 20, when the first terminal 100 determines whether to allow the second terminal 200 to unlock the screen of the second terminal 200, a prompt box may be used on the first terminal 100 to prompt the user whether to unlock the screen of the second terminal 200. If the user confirms to unlock the screen of the second terminal 200, permission to unlock the screen of the second terminal is obtained from the user. 1n this case, the first terminal 100 sends the message for allowing screen unlocking to the second terminal 200.

Alternatively, the first terminal 100 may determine, based on a currently running specific application, whether to allow the second terminal 200 to unlock the screen of the second terminal 200. For example, if the first terminal 100 currently displays display content that includes user privacy, the user privacy displayed on the first terminal 100 may also be projected onto a display of the second terminal 200 if the second terminal 200 is allowed to unlock the screen of the second terminal, and consequently user privacy disclosure is caused. Therefore, in this case, the first terminal does not allow the second terminal to unlock the screen. Specifically, in this case, the first terminal 100 may send a message for disallowing screen unlocking to the second terminal 200, and the second terminal 200 still keeps in a screen-locked state after receiving the message for disallowing screen unlocking.

Correspondingly, if the first terminal 100 does not display content that includes user privacy currently, the first terminal 100 may allow the second terminal 200 to unlock the screen of the second terminal. In this case, similar to step 502, the first terminal 100 sends the screen unlocking instruction to the second terminal 200 to remove a screen locking window loaded on the second terminal 200, so that the second terminal 200 enters the screen-unlocked state.

A privacy application described above may be manually set by the user on the first terminal, or may be automatically set by the first terminal based on application reading permission. For example, an application in which reading an SMS message or a photo of the user is allowed is set as the private application. This is not limited in this embodiment of this application.

Figure 21:
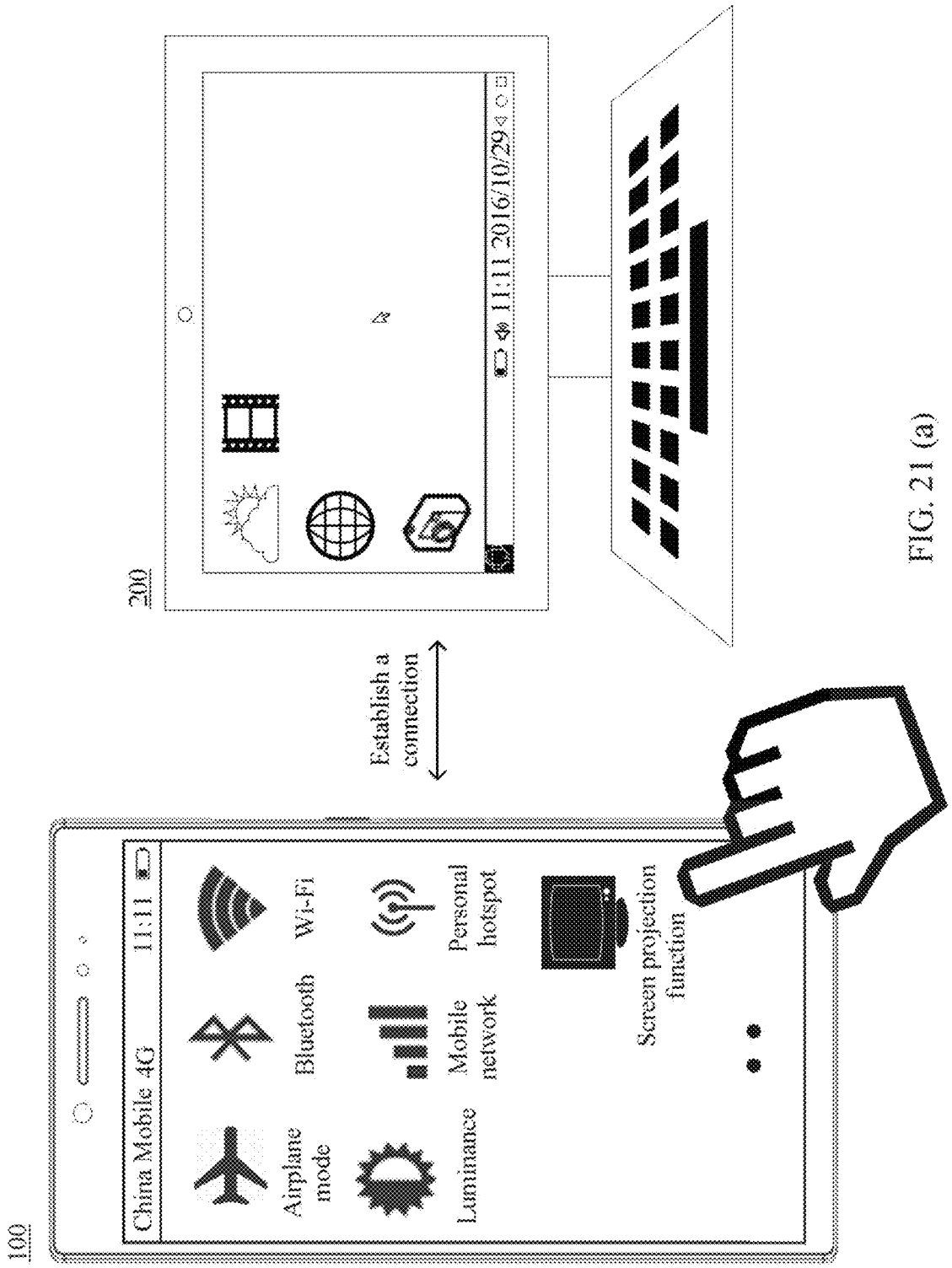
FIG. 21 (a), FIG. 21 (b), and FIG. 21 (c) are a schematic diagram 13 of an application scenario of a screen locking method according to an embodiment of this application.
Figure 21:
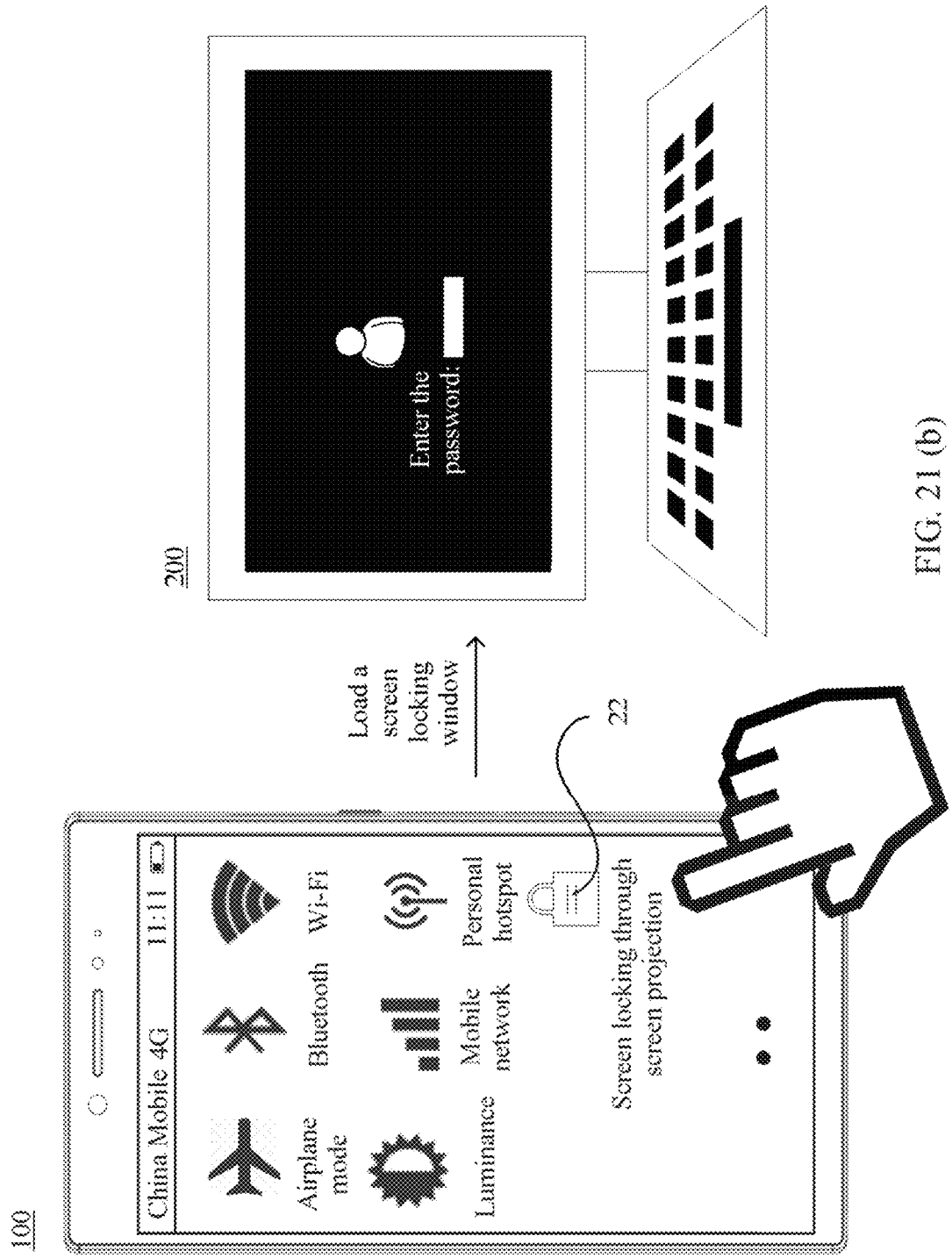
Figure 21:
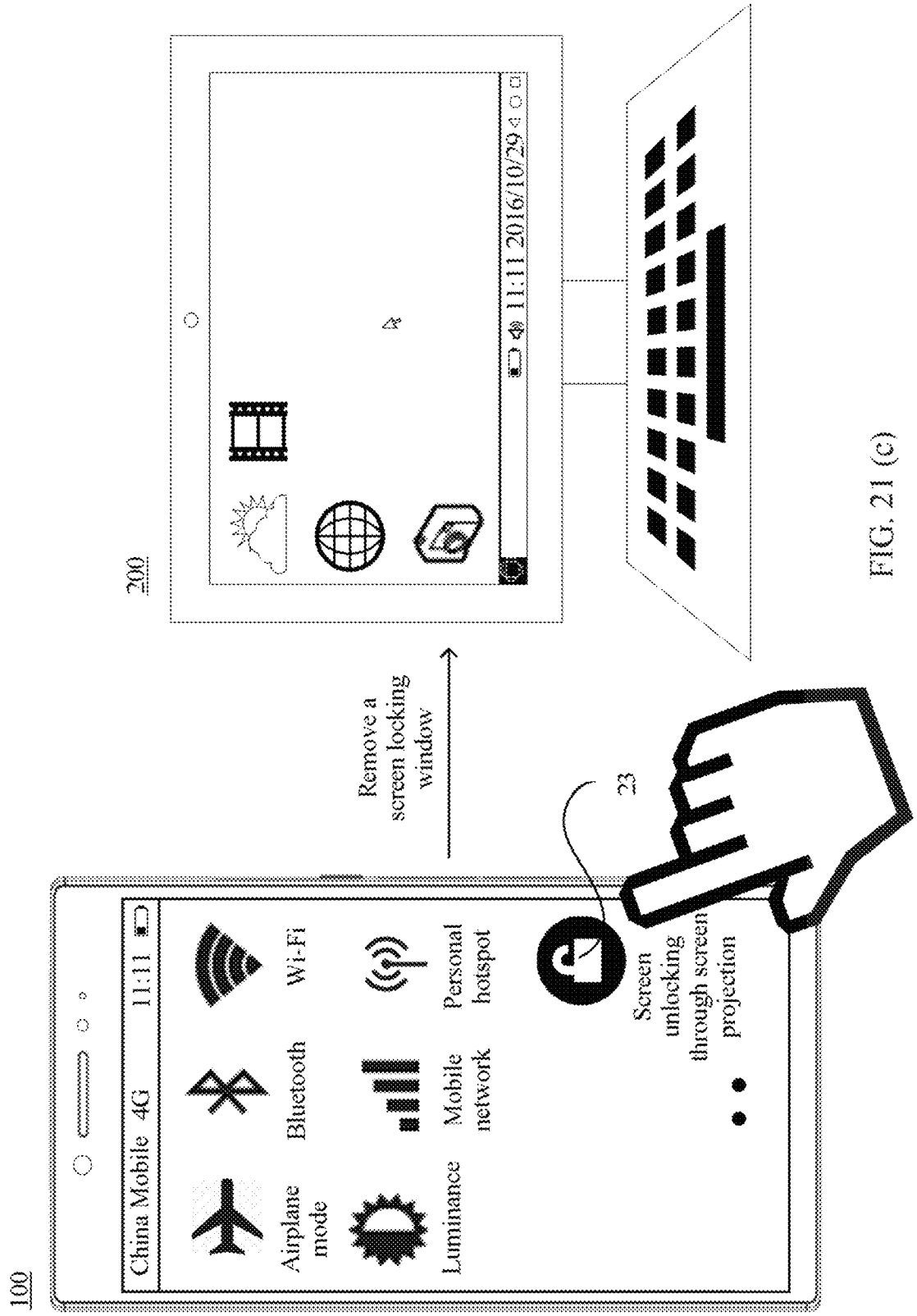

For example, as shown in FIG. 21 (a), a shortcut button having a screen projection function is disposed in a drop-down list of the first terminal 100. When the first terminal 100 detects that the user taps the shortcut button having a screen projection function, the first terminal 100 may be triggered to establish a connection to the second terminal 200. For example, reference may be made to the related description in step 301. The first terminal may project display content on the first terminal 100 onto the display of the second terminal 200 by using a single-source display method or a multi-source display method.

As shown in FIG. 21 (b), after the first terminal 100 establishes the connection to the second terminal 200, a screen locking button 22 described above may be displayed at a location in the drop-down list at which the shortcut button having a screen projection function is originally displayed. The screen locking button 22 is for locking the screen of the second terminal 200. Therefore, as described in step 403, when it is detected that the user taps the screen locking button 22, the first terminal 100 may load, on the display interface of the second terminal 200, a screen locking window that covers a current display window, so that the second terminal 200 enters the screen-locked state. However, in this case, the first terminal 100 is still in a screen-unlocked state, so as to avoid a case in which user privacy displayed when the first terminal 100 is in the screen-unlocked state is disclosed after being projected onto the display of the second terminal 200.

As shown in FIG. 21 (c), after the second terminal 200 enters the screen-locked state, a screen unlocking button 23 described above may be displayed at a location in the drop-down list at which the foregoing screen locking button 22 is originally displayed. The screen unlocking button 23 is for unlocking the screen of the second terminal 200. Therefore, as described in step 502, when it is detected that the user taps the screen unlocking button 23, the first terminal 100 may remove the screen locking window loaded on the second terminal 200, so that the second terminal 200 enters the screen-unlocked state. In this case, an application window on the second terminal 200 that is originally covered by the screen locking window is displayed on the current display interface.

It can be learned that in this embodiment of this application, independent screen locking window are respectively disposed on a screen of a controlling device (namely, the first terminal) and a screen of a secondary device (namely, the second terminal). Therefore, when the screen of the second terminal needs to be locked, the first terminal may control the second terminal to load the screen locking window of the second terminal, or the second terminal itself may load the screen locking window of the second terminal, so as to reduce a risk of user privacy disclosure caused by projecting user privacy displayed on the first terminal onto the second terminal. When the screen of the second terminal needs to be unlocked, the first terminal grants screen unlocking permission to the second terminal to control the second terminal to remove the loaded screen locking window, so as to avoid a risk of user privacy disclosure occurring after the screen of the second terminal is unlocked.

It can be understood that, to implement the foregoing functions, the terminal and the like include corresponding hardware structures and/or software modules for performing the functions. A person skilled in the art should easily be aware that, in combination with units and algorithm steps of the examples described in the embodiments disclosed in this specification, the embodiments of this application may be implemented by using hardware or a combination of hardware and computer software. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of the embodiments of this application.

In the embodiments of this application, the terminal may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that the module division in the embodiments of this application is an example, and is merely logical function division and may be other division in actual implementation.

Figure 22:
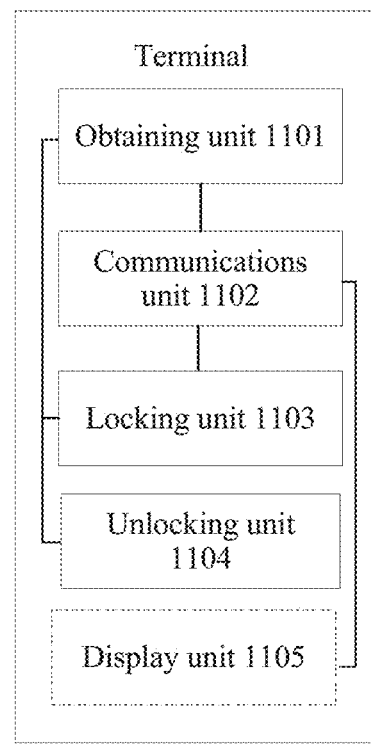
FIG. 22 is a schematic structural diagram 2 of a terminal according to an embodiment of this application.

When each function module is obtained through dividing by using a corresponding function, FIG. 22 is a possible schematic structural diagram of a terminal (for example, the foregoing first terminal or the foregoing second terminal) used in the foregoing embodiments. The terminal includes an obtaining unit 1101, a communications unit 1102, a locking unit 1103, and an unlocking unit 1104.

The obtaining unit 1101 is configured to support the terminal in performing the process 302 in FIG. 3, the process 402 in FIG. 8, the process 501 in FIG. 16, and the process 601 in FIG. 19. The communications unit 1102 is configured to support the terminal in performing the process 301 in FIG. 3, the process 401 in FIG. 8, the process 502 in FIG. 16, and the process 602 in FIG. 19. The locking unit 1103 is configured to support the terminal in performing the process 303 in FIG. 3 and the process 403 in FIG. 8. The unlocking unit 1104 is configured to support the terminal in performing the process 503 in FIG. 16 and the processes 603 and 604 in FIG. 19.

Further, still as shown in FIG. 22, the terminal may include a display unit 1105, configured to display an icon of a screen unlocking button. The icon of the screen unlocking button and an icon of the screen locking button are at a same location. Alternatively, the display unit 1105 may be configured to display an icon of a connection button configured to connect to the second terminal, and the icon of the connection button and an icon of the screen locking button are at a same location.

All related content of the steps in the foregoing method embodiments may be cited in function descriptions of corresponding function modules in the summary. Details are not described herein again.

Figure 23:
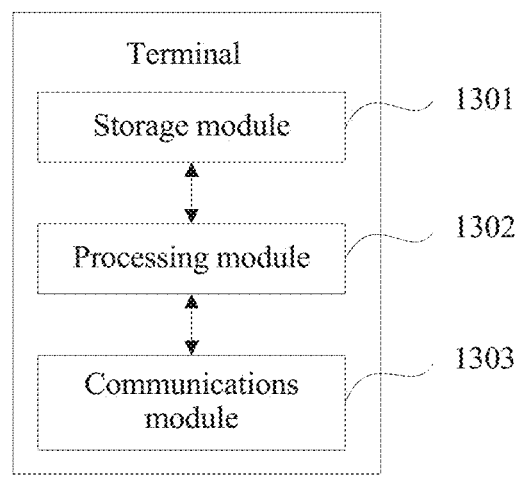
FIG. 23 is a schematic structural diagram 3 of a terminal according to an embodiment of this application.

When an integrated unit is used, FIG. 23 is a possible schematic structural diagram of a terminal (for example, the foregoing first terminal or the foregoing second terminal) used in the foregoing embodiments. The terminal includes a processing module 1302 and a communications module 1303. The processing module 1302 is configured to control and manage an action of the terminal. The communications module 1303 is configured to support the terminal in communicating with another network entity. The terminal may further include a storage module 1301, configured to store program code and data of the terminal.

The processing module 1302 may be a processor or a controller, such as a central processing unit (Central Processing Unit, CPU), a general purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or a combination thereof. The processing module may implement or execute various example logic blocks, modules, and circuits described with reference to content disclosed in this application. Alternatively, the processor may be a combination of processors implementing a calculation function, for example, a combination of one or more microprocessors, or a combination of a DSP and a microprocessor. The communications module 1303 may be a transceiver, a transceiver circuit, a communications interface, or the like. The storage module 1301 may be a memory.

When the processing module 1302 is a processor, the communications module 1303 is an RF transceiver circuit. When the storage module 1301 is a memory, the terminal provided in this embodiment of this application may be the mobile phone 100 shown in FIG. 2.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any available medium accessible by the computer, or a data storage device integrating one or more available media, such as a server or a data center. The available medium may be a magnetic medium (for example, a floppy disk, a hard disk, or a magnetic tape), an optical medium (for example, a DVD), a semiconductor medium (for example, a solid state disk Solid State Disk (SSD)), or the like.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A system, comprising a first electronic device and a second electronic device, wherein the first electronic device is coupled to the second electronic device for screen projection, and wherein the system is configured to:
    display, by the first electronic device;
    send, by the first electronic device, data of the first interface to the second electronic device;
    display, by the second electronic device, a second interface, wherein the second interface and the first interface are the same;
    stop, by the first electronic device display of the first interface;
    display, by the first electronic device, a third interface after stopping display of the first interface, wherein the third interface comprises an interface element related to user privacy;
    display, by the second electronic device, a fourth interface, when the second electronic device entering a screen-locked state, wherein the fourth interface is a screen-locked interface;
    stop, by the first electronic device, display of the third interface;
    display, by the first electronic device, a fifth interface after stopping display of the third interface;
    send, by the first electronic device, data of the fifth interface to the second electronic device; and
    display, by the second electronic device, a sixth interface, wherein the sixth interface and the fifth interface are the same.

2. The system of claim 1, wherein the second electronic device is further configured to:
    receive a screen locking instruction from the first electronic device; and
    enter the screen-locked state based on the screen locking instruction.

3. The system of claim 2, wherein the first electronic device is further configured to:
    send a screen locking instruction to the second electronic device causing the second electronic device to enter the screen-locked state in response to the screen locking instruction.

4. The system of claim 2, wherein the screen locking instruction includes screen-locked interface data, and wherein the screen-locked interface data is used to instruct the second electronic device to display the screen-locked interface corresponding to the screen-locked interface data.

5. The system of claim 1, wherein the system is further configured to cause the second electronic device to enter the screen-locked state automatically without user operation on the second electronic device.

6. The system of claim 1, wherein the system is further configured to:
    display, by the first electronic device, a fifth interface after the first electronic device stops displaying the third interface;
    send, by the first electronic device, data of the fifth interface to the second electronic device; and
    display, by the second electronic device, a sixth interface, wherein the fifth interface and the sixth interface are the same.

7. The system of claim 6, wherein the fifth interface is an interface of the first application.

8. The system of claim 1, wherein the first interface is an interface of a first application, and wherein the third interface is an interface of a second application.

9. The system of claim 1, wherein the third interface compromises at least one of: a notification message, a character, a picture, a video, or a program icon.

10. A method, comprising:
    establishing, by a first electronic device, a coupling to a second electronic device for screen projection;
    displaying, by the first electronic device, a first interface;
    sending, by the first electronic device, data of the first interface to the second electronic device;
    displaying, by the second electronic device, a second interface, wherein the second interface and the first interface are the same;
    displaying, by the first electronic device, a third interface after stopping display of the first interface; and
    displaying, by the second electronic device, a fourth interface, when the second electronic device enters a screen-locked state, wherein the fourth interface is a screen-locked interface.

11. The method of claim 10, further comprising:
    receiving, by the second electronic device, a screen locking instruction from the first electronic device; and
    entering, by the second electronic device, the screen-locked state based on the screen locking instruction.

12. The method of claim 11, further comprising:
    sending a screen locking instruction to the second electronic device causing the second electronic device to enter the screen-locked state in response to the screen locking instruction.

13. The method of claim 11, wherein the screen locking instruction includes screen-locked interface data, and wherein the screen-locked interface data is used to instruct the second electronic device to display the screen-locked interface corresponding to the screen-locked interface data.

14. The method of claim 10, wherein the second electronic device enters the screen-locked state automatically without user operation on the second electronic device.

15. The method of claim 10, wherein the method further comprises:

displaying, by the first electronic device, a fifth interface after the first electronic stops displaying the third interface;

sending, by the first electronic device, data of the fifth interface to the second electronic device; and displaying, by the second electronic device, a sixth interface, wherein the fifth interface and the sixth interface are the same.

16. The method of claim 15, wherein the first interface is an interface of a first application, and the third interface is an interface of a second application.

17. The method of claim 10, wherein the fifth interface is an interface of the first application.

18. The method of claim 10, wherein the third interface compromises at least one of; a notification message, a character, a picture, a video or a program icon.

19. A first electronic device, comprising:
a processor; and
a memory coupled to the processor and configured to store programming instructions that, when executed by the processor, cause the first electronic device to:
establish a coupling to a second electronic device;
display a first interface;
send data of the first interface to the second electronic device;
display a third interface after stopping display of the first interface; and
send a screen locking instruction to the second electronic device causing the second electronic device to enter a screen-locked state in response to the screen locking instruction.

20. The first electronic device of claim 19, wherein the first electronic device is configured to:
display a fifth interface after the first electronic stops displaying the third interface; and
send data of the fifth interface to the second electronic device.

21. The first electronic device of claim 20, wherein the fifth interface is an interface of the first application.

22. The first electronic device of claim 19 wherein the first interface is an interface of a first application, and wherein the third interface is an interface of a second application.

23. The first electronic device of claim 19, wherein the third interface compromises at least one of: a notification message, a character, a picture, a video or a program icon.

24. The first electronic device of claim 19, wherein the screen locking instruction includes screen-locked interface data, and wherein the screen-locked interface data is used to instruct the second electronic device to display the screen-locked interface corresponding to the screen-locked interface data.

* * * * *

UNITED STATES PATENT AND TRADEMARK OFFICE
CERTIFICATE OF CORRECTION

| | | |
|---|---|---|
| PATENT NO. | : 11,550,461 B2 | |
| APPLICATION NO. | : 16/622685 | |
| DATED | : January 10, 2023 | |
| INVENTOR(S) | : Dengkui Zhu and Jian Song | |

It is certified that error appears in the above-identified patent and that said Letters Patent is hereby corrected as shown below:

In the Claims

Claim 1, Column 27, Line 35: "electronic device;" should read "electronic device, a first interface;"

Signed and Sealed this
Twenty-first Day of February, 2023

Katherine Kelly Vidal
*Director of the United States Patent and Trademark Office*